(12) United States Patent
Popovich et al.

(10) Patent No.: US 6,687,030 B2
(45) Date of Patent: Feb. 3, 2004

(54) METHOD AND APPARATUS FOR ILLUMINATING A DISPLAY

(75) Inventors: Milan M. Popovich, Leicester (GB); Jonathan D. Waldern, Los Altos Hills, CA (US)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 10/337,931

(22) Filed: Jan. 7, 2003

(65) Prior Publication Data

US 2003/0164996 A1 Sep. 4, 2003

Related U.S. Application Data

(63) Continuation of application No. 09/533,120, filed on Mar. 23, 2000, now Pat. No. 6,504,629.
(60) Provisional application No. 60/125,924, filed on Mar. 23, 1999, provisional application No. 60/127,898, filed on Apr. 5, 1999, and provisional application No. 60/157,796, filed on Oct. 5, 1999.

(51) Int. Cl.$^7$ ................................................. G03H 1/26
(52) U.S. Cl. ............................. 359/15; 359/22; 359/4; 359/1; 349/201
(58) Field of Search ........................... 359/15, 13, 4–7, 359/22, 24, 567, 1; 349/201, 202

(56) References Cited

U.S. PATENT DOCUMENTS 5,764,317 A * 6/1998 Sadovnik et al. .............. 349/5

* cited by examiner

*Primary Examiner*—Drew Dunn
*Assistant Examiner*—Fayez Assaf
(74) *Attorney, Agent, or Firm*—Campbell Stephenson Ascolese LLP

(57) ABSTRACT

Disclosed is a device for producing colored light and an image generating apparatus including such a device. The device includes a switchable light-directing apparatus configured to receive light and a first control circuit coupled to the switchable light-directing apparatus. The first control circuit provides control signals to the switchable light-directing apparatus. In response to the switchable light-directing apparatus receiving a control signal, the switchable light-directing apparatus directs a first portion of the received light to a first region of a plane. Additionally, the switchable light-directing apparatus directs a second portion of the received light to a second region of the plane, and directs a third portion of the received light to a third region of the plane. The second region is positioned between the first and third regions of the plane.

21 Claims, 23 Drawing Sheets

| | |
|---|---|
| R | *114A* |
| G | *114B* |
| B | *114C* |
| | *114D* |
| | *114E* |
| | *114F* |

*FIG. 9A*

| | |
|---|---|
| | *114A* |
| R | *114B* |
| G | *114C* |
| B | *114D* |
| | *114E* |
| | *114F* |

*FIG. 9B*

| | |
|---|---|
| | *114A* |
| | *114B* |
| R | *114C* |
| G | *114D* |
| B | *114E* |
| | *114F* |

*FIG. 9C*

| | |
|---|---|
| | *114A* |
| | *114B* |
| | *114C* |
| R | *114D* |
| G | *114E* |
| B | *114F* |

*FIG. 9D*

| | |
|---|---|
| B | *114A* |
| | *114B* |
| | *114C* |
| | *114D* |
| R | *114E* |
| G | *114F* |

*FIG. 9E*

| | |
|---|---|
| G | *114A* |
| B | *114B* |
| | *114C* |
| | *114D* |
| | *114E* |
| R | *114F* |

*FIG. 9F*

METHOD AND APPARATUS FOR ILLUMINATING A DISPLAY

This continuation patent application claims priority to U.S. patent application entitled METHOD AND APPARATUS FOR ILLUMINATING A DISPLAY, Ser. No. 09/533,120, filed Mar. 23, 2000, now U.S. Pat. No. 6,504,629, which claims priority to Provisional application entitled METHOD AND APPARATUS FOR ILLUMINATING A DISPLAY, Ser. No. 60/125,924 filed Mar. 23, 1999; Provisional application entitled DEVICE FOR PRODUCING COLOURED LIGHT AND IMAGE GENERATING APPARATUS INCLUDING SUCH A DEVICE, Ser. No. 60/127,898 filed Apr. 5, 1999; and Provisional application entitled DEVICE FOR PRODUCING COLOURED LIGHT AND IMAGE GENERATING APPARATUS INCLUDING SUCH A DEVICE, Ser. No. 60/157,796 filed Oct. 5, 1999.

BACKGROUND OF THE INVENTION

1. Field of the Invention

The present invention relates generally to a method and apparatus for illuminating an image display, and more particularly to an apparatus and method for illuminating a color sequential image display.

2. Description of the Related Art

In color sequential displays, a display screen is used to display a sequence of monochrome frames corresponding to what will be the red, green and blue components of a final monochromatic image. A typical color sequential display may take form in a reflective LCD micro display. The images generated by the display are illuminated in succession by a red, green, and blue light so that the red light illuminates the red monochromatic frame of the final monochromatic image, the green light illuminates the green frame of the final monochrome image, and the blue light illuminates the blue frame of the final image. Components of a subsequent monochromatic image are illuminated in the same fashion. Switching from one image to the next is performed very rapidly so that an observer sees what is effectively a full color image.

The successive illumination of image frames by red, green, and blue light is typically achieved using a white light source and a rotating color wheel; such wheels are prone to mechanical failure. Alternatively, the successive illumination of monochromatic frames of an image by red, green, and blue light may be achieved using a white light source and a solid-state device such as a liquid crystal polarization switch. Unfortunately this alternative technique has a disadvantage. More particularly, the solid-state techniques that employ devices such as liquid crystal polarization switches work only with polarized light. Accordingly, at least half of the light available for illuminating a particular monochromatic frame is immediately lost. A more important problem with the mechanical and solid-state techniques for illuminating color sequential displays is that only a third of the available white light is used for illuminating the red, green and blue monochromatic frames of the image collectively. In other words, at least two thirds of the available white light is unused at any given moment. For example, when the red monochromatic frame of a final image is displayed, only red light is used to illuminate, while the green and blue components of the white light source are filtered out and unused.

SUMMARY OF THE INVENTION

The present relates to a device for producing colored light and an image generating apparatus including such a device. The device includes a switchable light-directing apparatus configured to receive light and a first control circuit coupled to the switchable light-directing apparatus. The first control circuit provides control signals to the switchable light-directing apparatus In response to the switchable light-directing apparatus receiving a control signal, the switchable light-directing apparatus directs a first portion of the received light to a first region of a plane. Additionally, the switchable light-directing apparatus directs second and third portions of the received light to second and third regions, respectively, of the plane. The second region is positioned between the first and third regions of the plane.

In one embodiment, the switchable light-directing apparatus comprises a first group of electrically switchable holographic optical elements comprising first, second, and third electrically switchable holographic optical elements each of which is electrically switchable between an active state and an inactive state. Each of the first, second, and third electrically switchable holographic optical elements is configured to diffract light incident thereon when operating in the active state, and each of the first, second, and third electrically switchable holographic optical elements transmits light incident thereon without substantial alteration when operating in the deactive state. In this embodiment, each of the first, second and third electrically switchable holographic optical elements is activated or deactivated by the first control circuit.

BRIEF DESCRIPTION OF THE DRAWINGS

While the invention is susceptible to various modifications and alternative forms, specific embodiments thereof are shown by way of example and the drawings and will be herein described in detail. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims.

The present invention may be better understood, and it's numerous objects, features, and advantages made apparent to those skilled in the art by referencing the accompanying drawings.

FIG. 9 illustrates operational aspects of still another embodiment of the switchable optics system and image surface employable in the embodiments shown in FIGS. 1–6;

DESCRIPTION OF THE PREFERRED EMBODIMENT(S)

Figure 1:
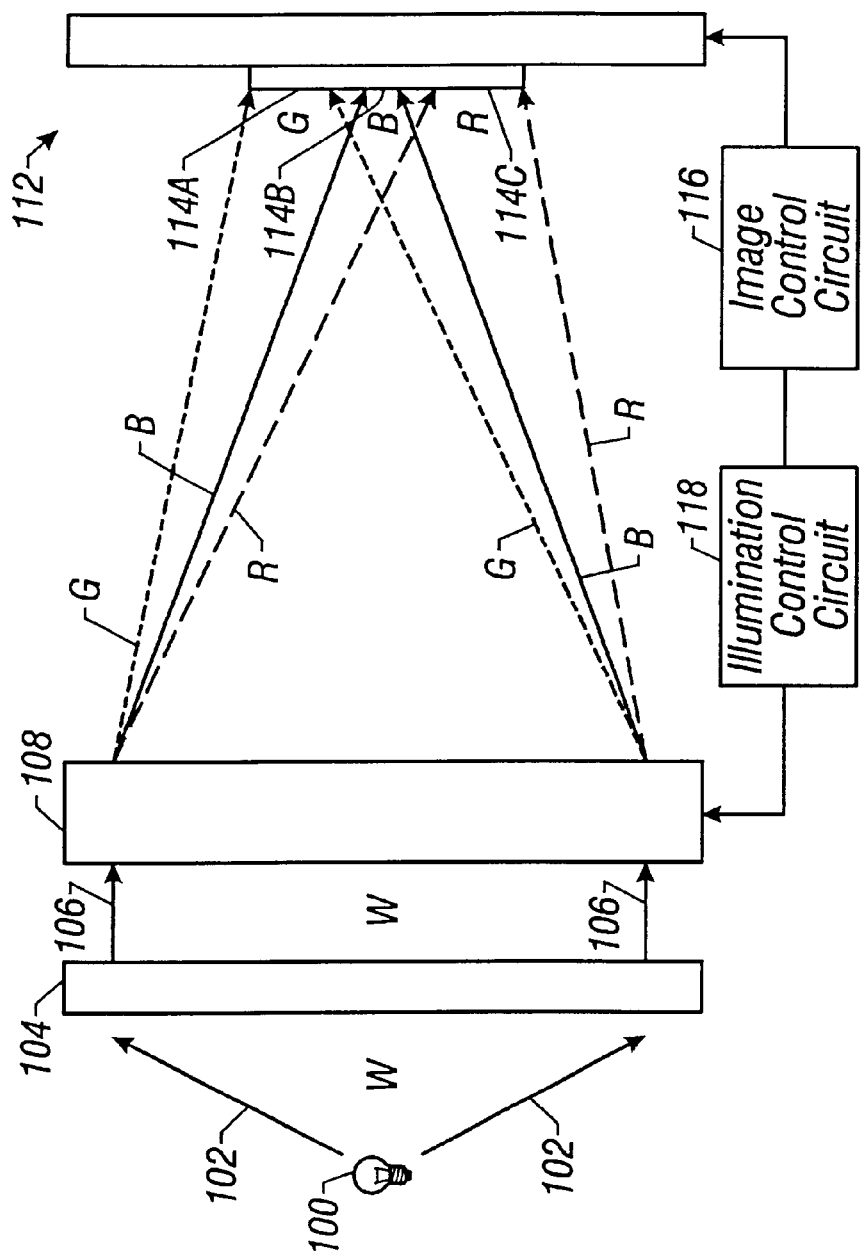
FIG. 1 shows a first embodiment of a transmissive type device for producing colored light and an image generating apparatus.

FIG. 1 shows one embodiment of a system having a light transmissive type device for producing colored light and an image generating apparatus. FIG. 1 shows a light source 100 for generating white light 102, collimation optics 104, switchable optics system 108, image display system 112 having an image display surface 114 typically comprising an array of pixels for displaying monochromatic data, image control circuit 116, and illumination control circuit 118.

White light 102 generated by light source 100 is received by collimation optics 104. Collimation optics 104, in turn, collimates white light 102 to produce collimated white light 106. Switchable optics system 108 receives collimated white light 106 and produces at least three distinct bandwidths of illumination light in response thereto. In the preferred embodiment, switchable optics system 108 generates red (R), green (G), and blue (B) bandwidth illumination lights. Switchable optics system 108 produces the illumination lights as a result of shaping, filtering, focusing, and/or correcting collimated white light 106. Additionally, switchable optics system 208 selectively directs illumination lights onto subsurfaces of the image display surface.

The switchable optics system 108 simultaneously illuminates at least three distinct subsurface areas of image display surface 114 with the illumination lights R, G, B, respectively. Preferably, the three subsurfaces are of equal size. With reference to FIG. 1, switchable optics system 108 simultaneously illuminates the entire surface 114 by illuminating each of three adjacent subsurfaces 114A–114C with one of the illumination lights R, G, B. The switchable optics system 108, or any of the switchable optics systems described below, should not be limited to simultaneously illuminating the entire surface 114 with the three illumination lights. The switchable optics system 108 may simultaneously illuminate three subsurfaces of lesser size than that shown in FIG. 1. For example, the switchable optics system 108, or any other switchable optics system described herein, may simultaneously illuminate each of only three lines of pixels on the display surface with a respective one of the three illumination lights. Additionally, the switchable optics system 108, or any other switchable optics system described herein, may simultaneously illuminate each of only three pixels on the display surface with a respective one of the three illumination lights.

Display surface 114 displays monochromatic data of monochromatic images in accordance with signals generated by image control circuit 116. Each monochromatic image consists of three monochromatic frames (i.e., a red monochromatic frame, a green monochromatic frame, and a blue monochromatic frame). With reference to FIG. 1, each monochromatic image is displayed in a three-stage cycle. In each cycle, a portion of each monochromatic frame is displayed on each of the subsurfaces 114A, 114B, and 114C. For example, in the first stage, subsurface 114A displays the top monochromatic component of the red frame while subsurfaces 114B and 114C display middle and bottom monochromatic components of the green and blue frames, respectively. In the second cycle, subsurface 114A displays the top monochromatic component of the green frame while subsurfaces 114B and 114C display middle and bottom monochromatic components of the blue and red frames, respectively. In the third and last stage of the cycle, subsurface 114A displays the top monochromatic component of the blue frame while subsurfaces 114B and 114C display middle and bottom monochromatic components of the red and green frames, respectively.

Illumination control circuit 118 is coupled to image control circuit 116 and switchable optics system 108. Switchable optics system 108, operating under command of control circuit 118, selectively directs each of the illumination lights R, G, and B to one of the subsurfaces 114A–114C. Illumination control circuit 118 is linked to image control circuit 116 and operates in sync therewith. In the embodiment shown in FIG. 1, switchable optics system 108 operates in a three-stage cycle. In the first stage, switchable optics system 108 receives one or more control signals from control circuit 118 and, in response thereto, directs illumination light R onto subsurface 114A while subsurface 114A displays the top component of the red monochromatic frame as described above. Switchable optics system 108 also directs illumination lights G and B onto subsurfaces 114B and 114C, respectively, in the first cycle, while subsurfaces 114B and 114C display the middle and bottom component of the green and blue monochromatic frames, respectively. In the second cycle, switchable optics system 108 receives one or more second control signals and, in response thereto, directs illumination light G onto subsurface 114A while subsurface 114A displays the top component of the green monochromatic frame as described above. Switchable optics system 108 also directs illumination lights B and R onto subsurfaces 114B and 114C, respectively, in the second cycle, while subsurfaces 114B and 114C display the middle and bottom component of the blue and red frames, respectively. In the third cycle, switchable optics system 108 receives one or more third control signals and, in response thereto, directs illumination light B onto subsurface 114A while subsurface 114A displays the top component of the blue monochromatic frame as described above. Switchable optics system 108 also directs illumination lights R and G onto subsurfaces 114B and 114C, respectively, in the third cycle, while subsurfaces 114B and 114C display the middle and bottom component of the red and green monochromatic frames, respectively.

FIG. 1 shows the second stage of this three-stage cycle in which: subsurface 114A is illuminated with green illumination light G as subsurface 114A displays the top monochromatic component of the green frame; subsurface 114B is illuminated with blue illumination light B as subsurface 114B displays the middle monochromatic component of the blue frame, and; 114C is illuminated with red illumination light R as subsurface 114C displays the bottom monochromatic component of the red frame. If the monochromatic components displayed in the first and third stages are illuminated in similar fashion, and if the switching rate between the three stages is fast enough, than an observer will be able to eye integrate the illuminated components into the final image.

When the three stage cycle has completed, image control circuit 116 initiates a new three stage cycle for the next image. The present invention should not be limited to displaying the monochromatic image in a three stage cycle. The present invention could be implemented with three lines of each monochromatic frame being simultaneously displayed on three lines of pixels of the image display surface. In this alternative embodiment, the monochromatic image is scrolled down the display surface as it is illuminated with illumination lights R, B, and B. Additionally, the present invention could be implemented with three pixels of each monochromatic frame being simultaneously displayed on three pixels of the image display surface. In this alternative embodiment, the monochromatic image is scrolled across and down the display surface as it is illuminated with illumination lights R, B, and B.

Figure 7A:
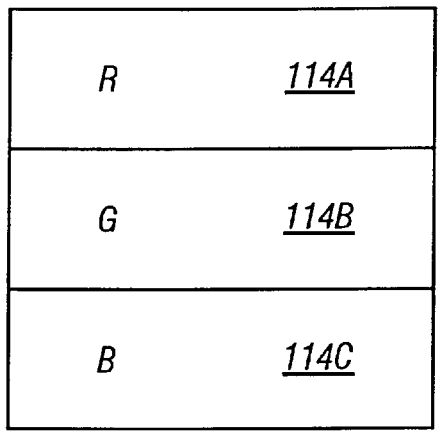
FIGS. 7A–7C illustrate operational aspects of one embodiment of the switchable optics system and image surface employable in the embodiments shown in FIGS. 1–6.
Figure 7B:
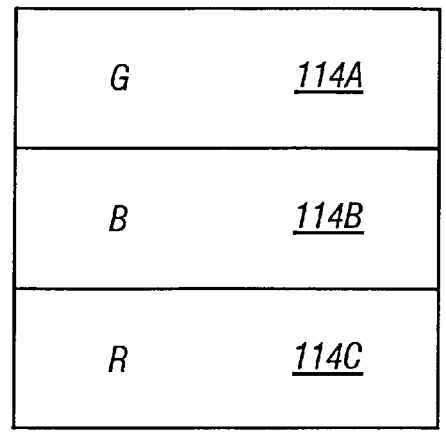
Figure 7C:
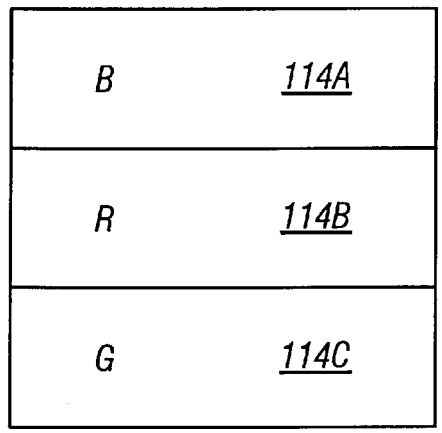

FIGS. 7A–7C illustrate front views of display surface 114 of FIG. 1. FIGS. 7A–7C further illustrates how switchable optics system 108 properly illuminates the monochromatic components of the final image. In FIG. 7A, subsection 114A is illuminated with R when subsection 114A displays what will be the red monochrome component of the final image in that subsurface. Subsection 114B is illuminated with G when subsection 114B displays the green monochrome component of the final image in that section. Subsection 114C is illuminated with B when subsection 114C displays the blue monochrome component of the final image in that section. FIGS. 7B and 7C show illumination of the subsections 114A–114C as the subsurfaces cycle through what will be the monochromatic components of the final image.

Figure 2:
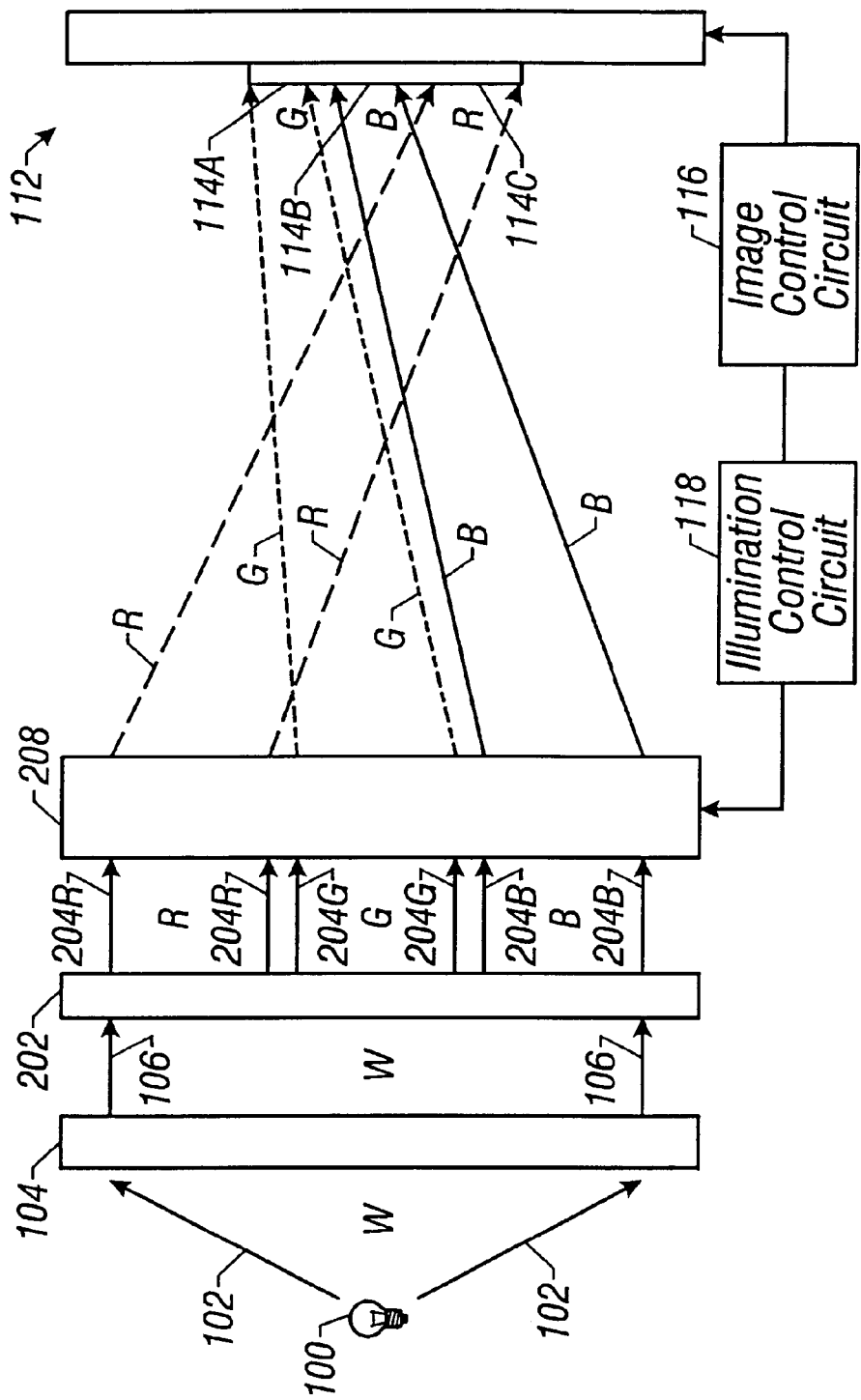
FIG. 2 shows a second embodiment of a transmissive type device for producing colored light and an image generating apparatus.

FIG. 2 shows an alternative embodiment of a system having a light transmissive type device for producing colored light and an image generating apparatus. The embodiment shown in FIG. 2 includes white light source 100 which generates a white light 102, collimation optics 104, filter 202, switchable optics system 206, image display system 112 having an display surface 114, image control circuit 116, and illumination control circuit 118. It is noted that the same reference number identifies similar components in the Figures.

Collimation optics 104 in FIG. 2 collimates white light 102 into collimated white light 106. Filter 202 receives and filters collimated white light 106 to produce at least three spatially separated and bandwidth distinct output lights 204R, 204G, and 204B. In the embodiment shown in FIG. 2, output light 204R constitutes the red bandwidth component of collimated white light 106, output light 204G constitutes the green bandwidth component of collimated white light 106, and output the light 204B constitutes the blue bandwidth component of collimated white light 106.

Switchable optics system 208 shapes, focuses and/or corrects output lights 204R, 204G and 204B to produce illumination lights R, G and B, respectively. Additionally, switchable optics system 208 selectively directs illumination lights onto subsurfaces of the image display surface. Image display system 112 displays monochromatic images in the same fashion described with reference to FIG. 1. Illumination control circuit 118 controls switchable optics system 208 in synchronization with the monochromatic components displayed on display surface 114.

Switchable optics system 208 operates in a three-stage cycle. In the first stage of the three-stage cycle, switchable optics system 208 directs illumination lights R, G, and B onto display surfaces 114A, 114B, and 114C, respectively, as image subsurfaces 114A, 114B, and 114C, display the appropriate monochromatic components of the final image. In the second stage of the three-stage cycle, switchable optics system 208 directs illumination lights R, G and B onto image subsurfaces 114C, 114A and 114B, respectively, while image subsurfaces 114C, 114A and 114B display the appropriate monochromatic components of the final image. In the third stage of the three-stage cycle, switchable optics system 208 directs illumination lights R, G, and B onto subsurfaces 114B, 114C and 114A, respectively, while subsurfaces 114B, 114C, and 114A display the appropriate monochromatic components of the final image. It is noted in FIGS. 1 and 2 that all or substantially all of collimated white light 106 is used to illuminate display surface 114 as display surface 114 displays the final image.

Figure 3:
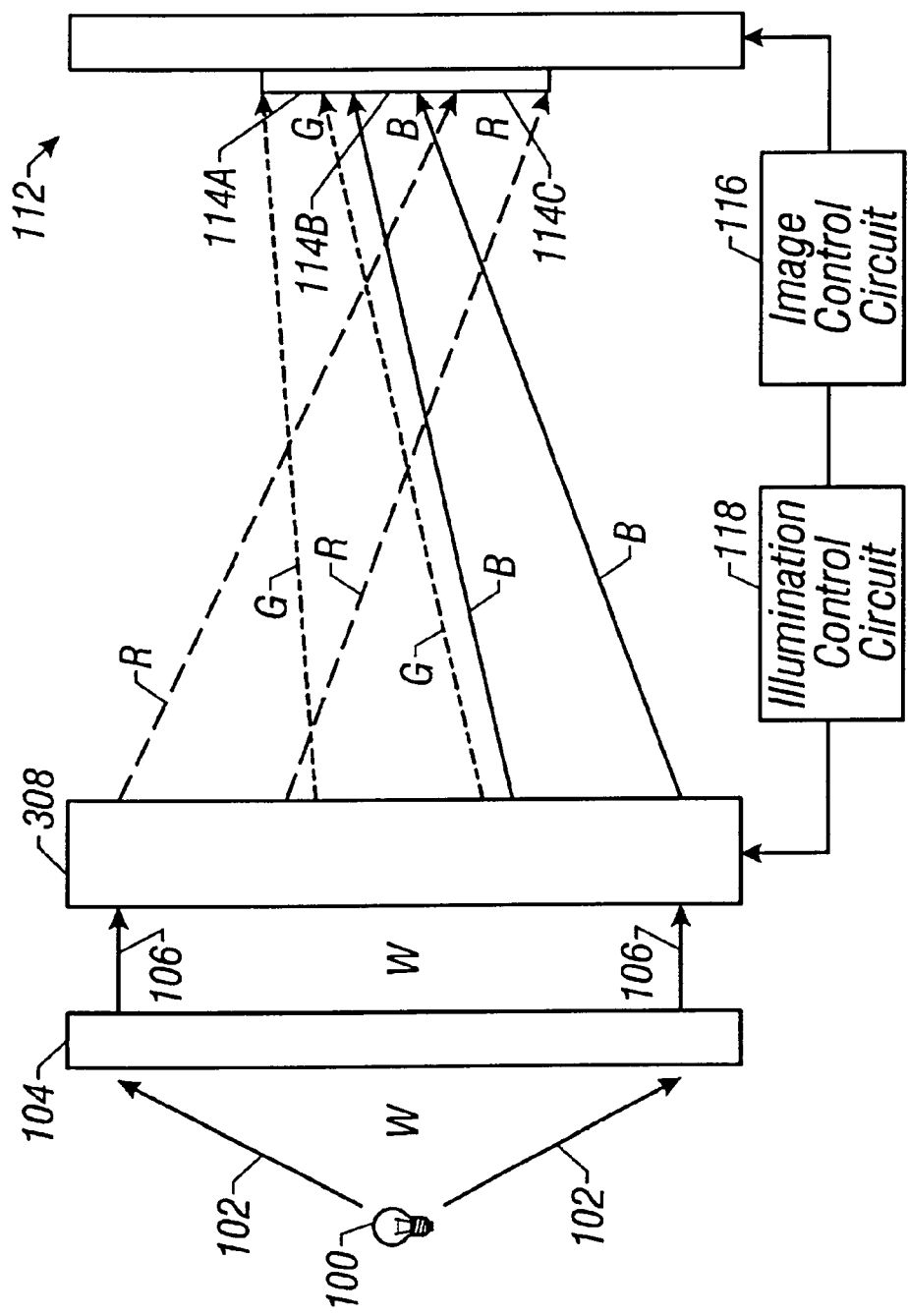
FIG. 3 shows a third embodiment of a transmissive type device for producing colored light and an image generating apparatus.

FIG. 1 shows another embodiment of a system having a light transmissive type device for producing colored light and an image generating apparatus. FIG. 3 shows light source 100, collimation optics 104, switchable optics system 308, image display system 112 having an display surface 114, image control circuit 116, and illumination control circuit 118. With the exception of switchable optics system 308 the embodiments of FIGS. 1 and 3 are identical. The main difference between the systems of FIGS. 1 and 3 relates to the intensity of illumination lights R, G, and B produced by switchable optics system 308. Unlike the embodiments shown in FIGS. 1 and 2, switchable optics system 308 shown in FIG. 3 illuminates the entire display surface 114 with less than substantially all available collimated white light 106 at any given time.

Figure 4:
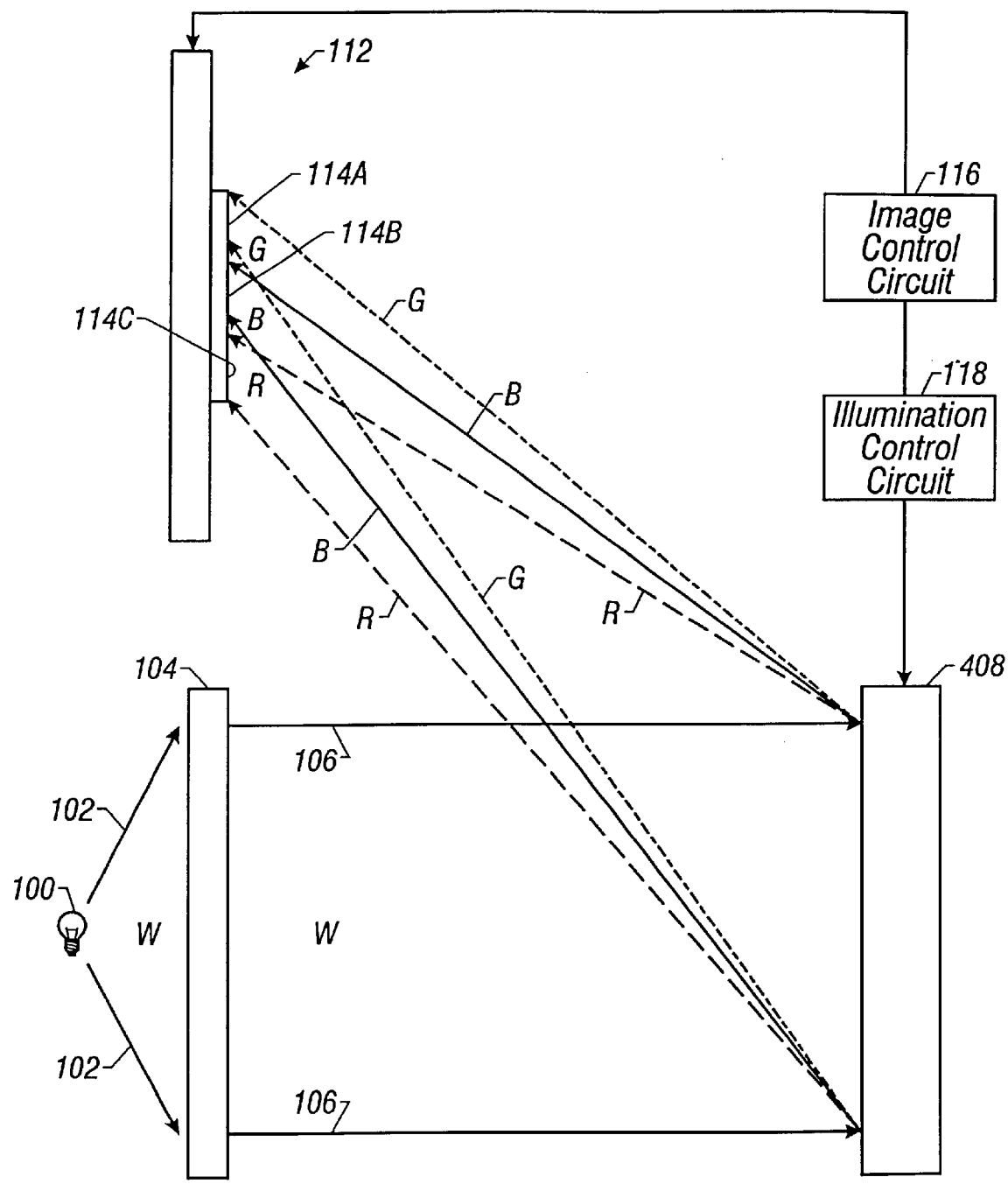
FIG. 4 shows a first embodiment of a reflective type device for producing colored light and an image generating apparatus.

The embodiments shown in FIGS. 1 through 3 include a transmissive-type switchable optics system. The present invention can be employed with a reflective type switchable optics system. FIG. 4 shows the embodiment of FIG. 1 with switchable optics system 108 replaced by switchable optics system 408, and with image display system 112 repositioned to take advantage of the reflective properties of switchable optics system 408. Except for its reflective properties, switchable optics system 408 operates in a manner substantially similar to switchable optics system 108 shown in FIG. 1.

Figure 5:
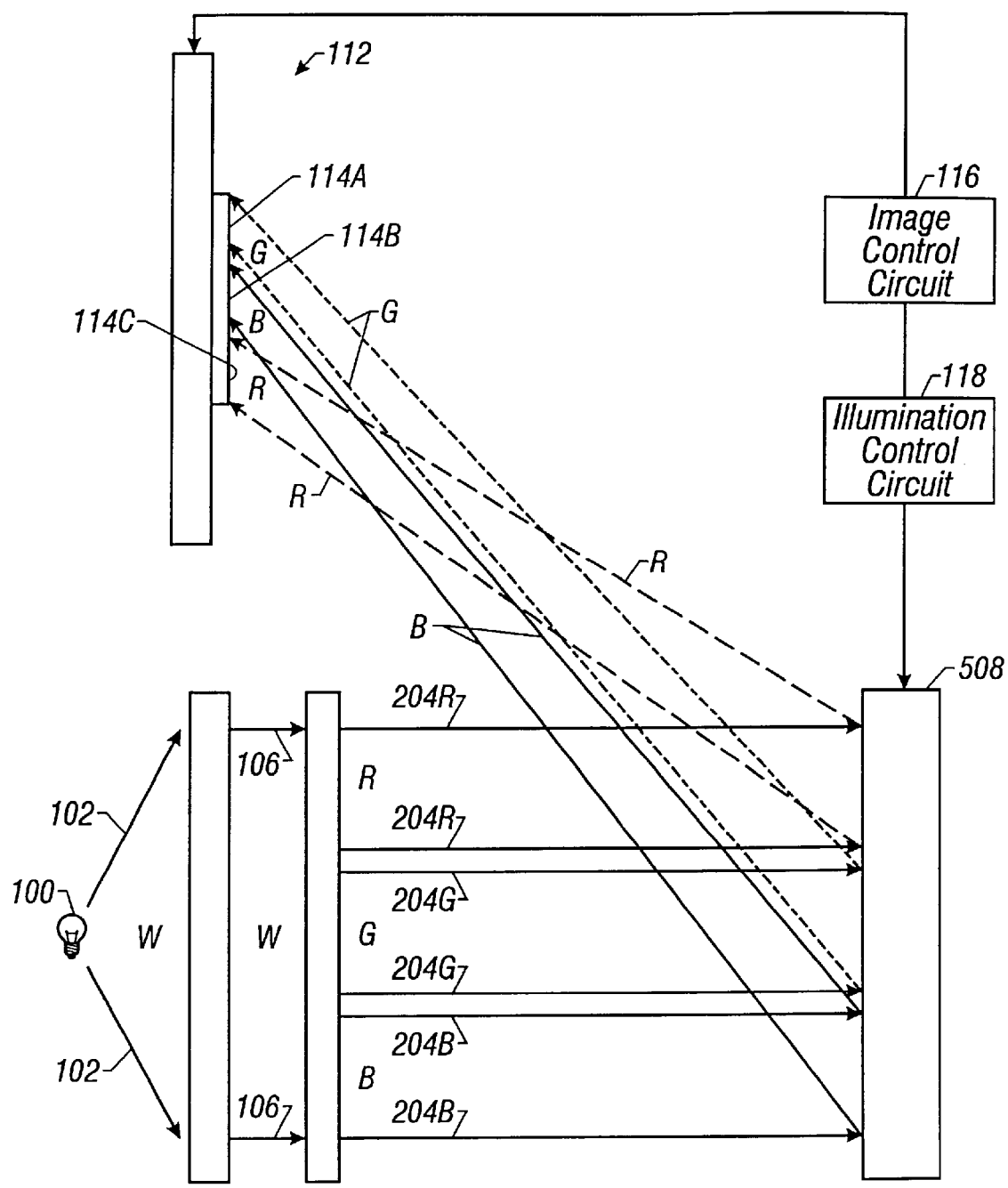
FIG. 5 shows a second embodiment of a transmissive type device for producing colored light and an image generating apparatus.
Figure 6:
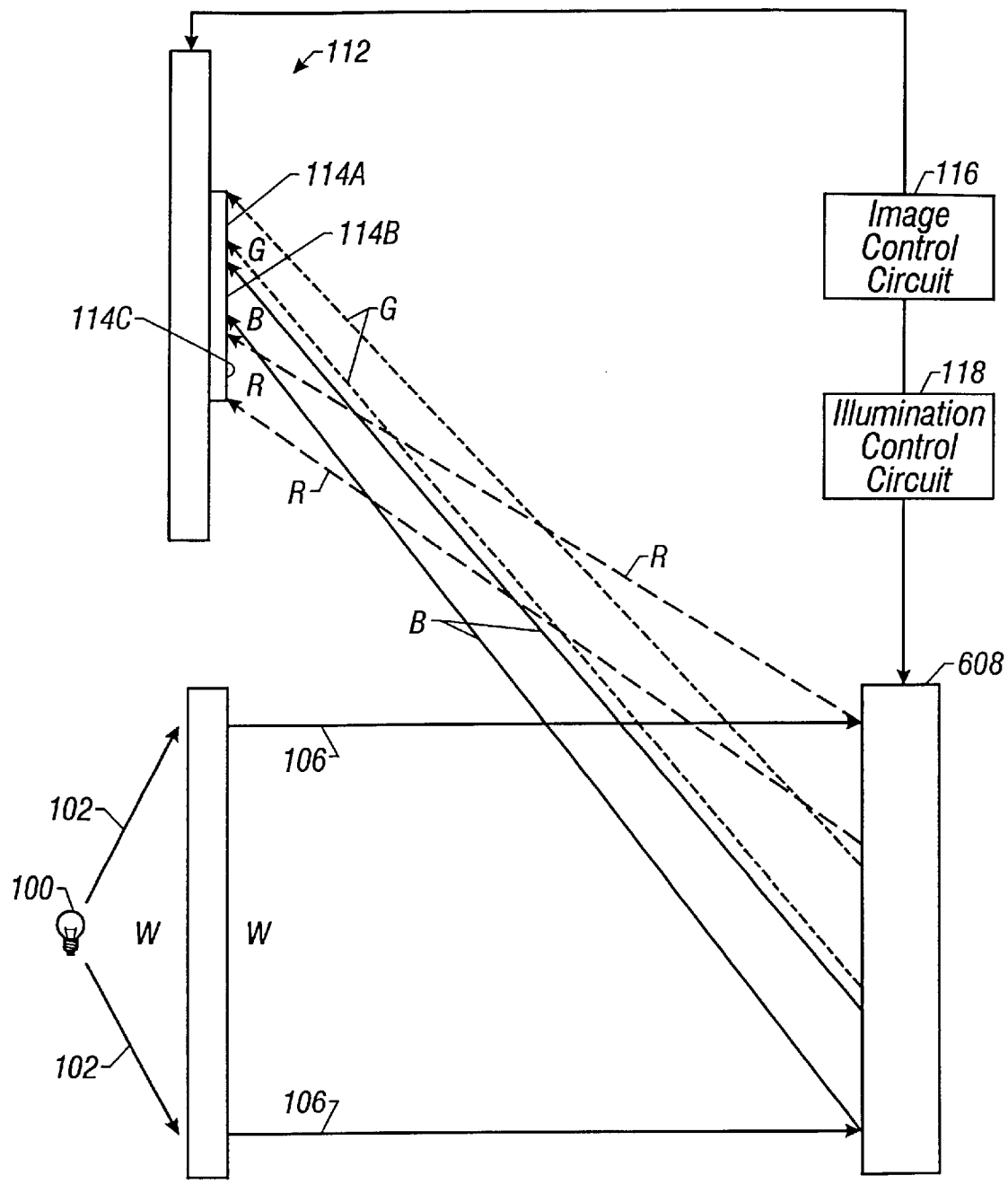
FIG. 6 shows a third embodiment of a transmissive type device for producing colored light and an image generating apparatus.

In FIG. 1, switchable optics system 108 emits illumination lights R–B from a surface opposite a surface that receives collimated white light 106. In contrast, reflective-type switchable optics system 408 emits illumination lights R–G from the same surface that receives collimated white light 106. FIG. 5 shows the system of FIG. 2 with switchable optics system 208 replaced by switchable optics system 508, and with image display system 112 repositioned to take advantage of the reflective properties of switchable optics system 508. Switchable optics system 508 is a reflective-type system, whereas switchable optics system 208 shown in FIG. 2 is a transmissive-type system. FIG. 6 shows the system of FIG. 3 with the transmissive switchable optics system 308 replaced by reflective-type switchable optics system 608. Again, like the system shown in FIG. 3, switchable optics system 608 shown in FIG. 6 illuminates surface 114 with less than substantially all of collimated white light 106.

Figure 8:
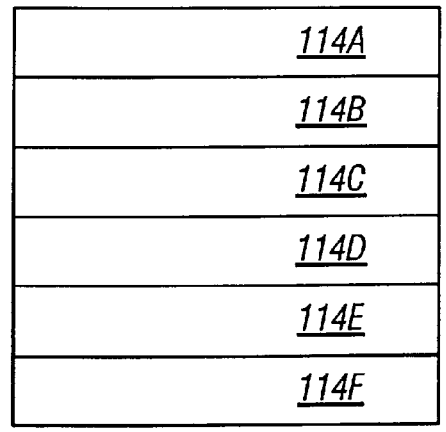
FIG. 8 illustrates operational aspects of another embodiment of the switchable optics system and image surface employable in the embodiments shown in FIGS. 1–6.

FIGS. 7A through 7C illustrate one mode in which monochromatic components of the final image image are displayed and illuminated on image surface 114. As shown display surface 114 is divided into three areas of equal size, each of which is cyclically and sequentially illuminated with red, green, and blue illumination light as the appropriate monochromatic component is displayed thereon. The present invention should not be limited thereto. FIG. 8 shows a front-view of display surface 114 which is divided into six subsurfaces 114A through 114F. In this embodiment subsurfaces 114A and 114D sequentially and cyclically display in monochrome what will be red, blue and green components of the final image in those subsurfaces, subsurfaces 114B and 114E sequentially and cyclically display in monochrome what will be green, red and blue components of the final image in those regions, and subsurfaces 114C and 114F sequentially and cyclically display in monochrome what will be blue, green and red components of the final image in those regions. Moreover, when subsurfaces 114A and 114D are displaying their red monochromatic components, subsurfaces 114B and 114E display their green monochromatic components and subsurfaces 114C and 114F display their blue monochromatic components, and so on. To illuminate the monochromatic components of the final image displayed in the subsurfaces 114A through 114F, as shown in FIG. 8, the switchable optics system of FIGS. 1 through 6 must be modified to produce two separate groups of red, green, and blue illumination lights. In this embodiment, the first group of red, green and blue illumination lights are selectively directed to each of the subsurfaces 114A through 114C, while the second group of red, green and blue illumination lights are selectively directed to each of the subsurfaces 114D through 114F. Thus, the modified switchable optics system directs the red illumination lights to the two subsurfaces which display their red monochromatic components of the image at that time, while directing the green illumination lights to the two subsurfaces displaying their green monochromatic subcomponent image and the blue illumination lights to the two subsurfaces displaying their blue monochromatic subcomponent of the image at the time. The modified switchable optics systems operate in a cyclic manner so that the red, green, and blue illumination lights of the first group are directed to subsurfaces 14A through 14C in synchronism with the display thereon of red, green, and blue monochromatic components of the final image. Similarly the modified switchable optics systems operate in a cyclic manner so that the red, green, and blue illumination lights of the second group are directed to subsurfaces 114D through 114F in synchronism with the display thereon of red, green, and blue monochromatic components of the final image.

FIGS. 9A through 9F show a front-view of image display surface 114 operating in accordance with another embodiment. In this embodiment, surface 114 is divided into six subsurfaces 114A through 114F of equal size. It is noted that display surface 114 can be further divided into regions each of which occupies a line of pixels. However, the present invention will be illustrated with the image display divided into six distinct but equal-sized subsurfaces.

Whereas the display surface described above operate in a three-stage cycle to complete a full image, surface 114, shown in FIGS. 9A through 9F, operates in a six-stage cycle to completely display a final monochromatic image. Each subsurface 114A through 114F displays in monochrome what will be the red, green, and blue components of the final image in that section. However, the display of the red, blue, and green components does not occur sequentially or cyclically as described above. In this embodiment only three of the subsurfaces 114A through 114F at any given point in time display a red, green, and blue component of the final image. The display of the components of the final image scrolls down the display surfaces 114A through 114F as shown in FIGS. 9A through 9F. FIG. 9A illustrates the first stage of the six-stage cycle. In FIG. 9A, subsurfaces 14A through 14C display in monochrome what will be the red, green, and blue components of the final image, respectively, in those subsurfaces. In the second stage of the six-stage cycle as shown in FIG. 9B, subsurfaces 114B through 114D display the red, green, and blue components of the final image, respectively, in those sections. In the third stage of the six-stage cycle, as shown in FIG. 9C, subsurfaces 114C through 114E display in monochrome what will be the red, green, and blue components of the final image, respectively, in those sections. In the fourth stage, as shown in FIG. 9D, subsurfaces 14D through 14F display in monochrome what will be the red, green, and blue components of the final image, respectively, in those sections. In FIG. 9E, subsurfaces 114E, 114F, and 114A display in monochrome what will be the red, green, and blue components of the final image, respectively, in those sections. In the last stage, as shown in FIG. 9F, subsurfaces 114F, 114A, and 114B display the red, green, and blue components of the final image, respectively, in those sections.

FIGS. 9A through 9F represent snapshots of the display surface 114 during each stage of the six-stage cycle. Switchable optics systems 108, 208, 308, 408, 508 and 608 (described above) can be modified in order to illuminate only those subsurfaces 114A through 114F which display monochromatic components of the final image with the appropriate illumination light at any given time. More particularly, the modified switchable optics systems in this embodiment operate in a six-stage cycle. In the first stage of the six-stage cycle, the switchable optics systems direct the red, green, and blue illumination lights to subsurfaces 114A through 114C, respectively, as subsurfaces 114A through 114C display their red, green, and blue monochromatic components of the final image, respectively, as shown in FIG. 9A. In the second stage, the modified switchable optics systems direct the red, green, and blue illumination lights to subsurfaces 114B, 114C, and 114D, respectively, as subsurfaces 114B, 114C, and 114D display their red, green, and blue monochromatic components of the final image, respectively as shown in FIG. 9B. In the third stage of the six-stage cycle, the modified switchable optics systems direct red, green, and blue illumination lights to subsurfaces 114C, 114D and 114E, respectively, as subsurfaces 114C, 114D and 114E display their red, green, and blue monochromatic components of the final image, respectively as shown in FIG. 9C. In the fourth stage of the six-stage cycle, a modified switchable optics systems direct the red, green, and blue illumination lights to subsurfaces 114D, 114E and 114F, respectively, as subsurfaces 114D, 114E and 114F display their red, green, and blue monochromatic components of the final image, respectively as shown in FIG. 9D. In the fifth stage of the six-stage cycle, the modified switchable optics systems direct the red, green, and blue illumination lights onto subsurfaces 114E, 114F, and 114A, respectively, as subsurfaces 114E, 114F, and 114A display their red, green, and blue monochromatic components of the final image, respectively as shown in FIG. 9E. In the last stage of the six-stage cycle modified switchable optics systems direct their red, green, and blue illumination lights onto subsurfaces 114F, 114A, and 114B, respectively, as subsurfaces 114F, 114A, and 114B display their respective red, green, and blue components of the final image, respectively as shown in FIG. 9F. The switching or cycling of the modified switchable optics system and the display surface is such that an observer sees what is effectively the final image without any visible divisions between the subsurfaces 114A through 114F.

Figure 10B:
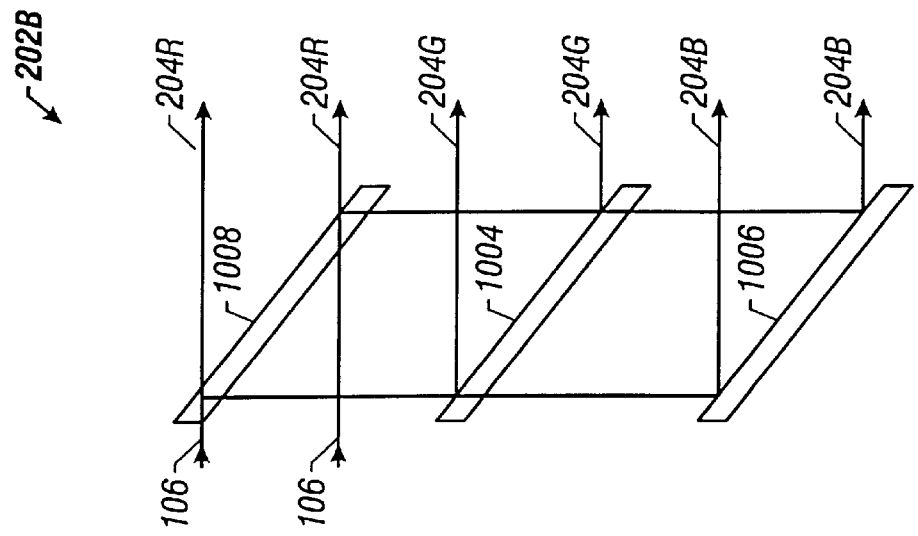
FIGS. 10A–10C show alternative embodiments of the filter employable in the embodiments shown in FIGS. 2 and 5.
Figure 10A:
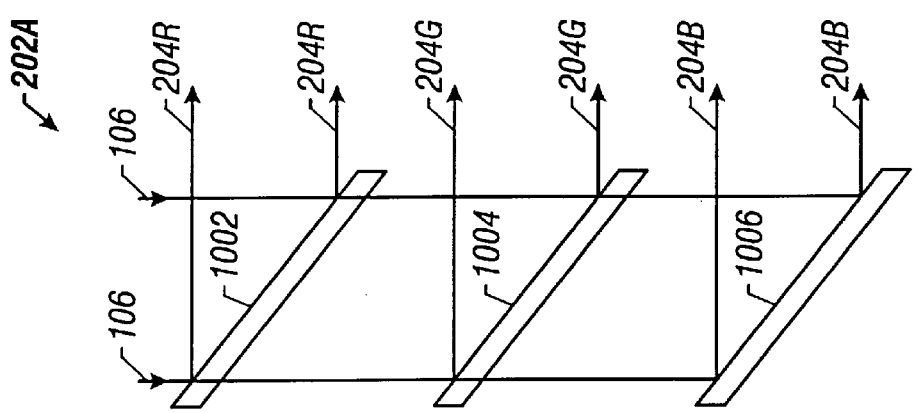
Figure 10C:
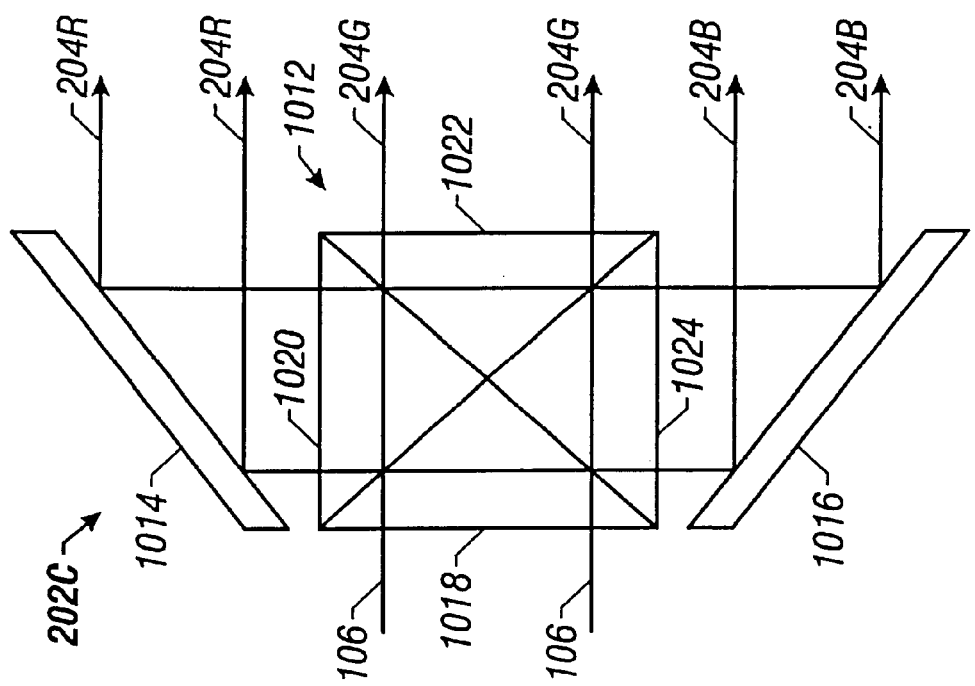

FIGS. 10A through 10C show alternative embodiments of the filter 202 employed in FIGS. 2 and 5. In FIG. 10A, filter 202 includes three dichroic filters 1002, 1004, and 1006 arranged in sequence along an optical path from the light source 100 (not shown in FIGS. 10A through 10C). More particularly, filter 1002 receives collimated white light 106 and reflects the red bandwidth component thereof sideways to produce output light 204R. Remaining components of collimated white light 106 pass through filter 1002 substantially unaltered. Filter 1004 receives the light transmitted through filter 1002 and reflects the green bandwidth component thereof sideways to produce green output light 204G while transmitting the blue bandwidth component without substantial alteration. The remaining blue bandwidth component of collimated white light is reflected sideways by filter 1006 to produce output light 204B.

Filter 202 shown in FIG. 10B is similar to that shown in FIG. 10A. However, dichroic filter 108 receives collimated white light and transmits the red bandwidth component thereof to produce output beam 204R while deflecting sideways the remaining blue and green bandwidth components of collimated white light. Filters 1004 and 1006 reflect the green and blue bandwidth components, respectively, of the light deflected by filter 1008 to produce output beams 204G and 204B, respectively, in the same fashion as shown in FIG. 10A.

FIG. 10C shows filter 202 including a dichroic prism 1012 with dichroic layers on its interfaces and a pair of plane mirrors 1014 and 1016. One example of the dichroic prism which can be employed in FIG. 10C, is manufactured by Nitto Optical of Japan under the name Cross Dichroic Prism. Such a prism is typically fabricated from glass such as DK7, and operates over the visible band from 420 nm to 680 nm and has a reflectivity of at least 94% for polarized light at normal incidence. It is also possible to employ prisms that have high transmission and are relatively insensitive to the polarization state of the incident light. Prism 1012 has an input face 1018 that receives collimated white light 106, and three output faces 1020, 1022, and 1024. The red bandwidth component of collimated white light 106 is deflected to one side by reflection and filtration at the prism interfaces, to emerge from output face 1020 as output light 204R. This light is then deflected 90 degrees by plane mirror 1014 towards the switchable optics system. The green bandwidth component of collimated white light 106 passes straight through prism 112 without substantial alteration to emerge as output light 204G from surface 1022. The blue bandwidth component of collimated white light 106 is deflected to one side by reflection and filtration at the prism interfaces to emerge from output face 1024 as illumination light 204B. 204B is deflected through 90 degrees by plane mirror 1026.

As noted above switchable optics systems 108, 208, 308, 408, 508, and 608 can direct the red, green, and blue illumination lights onto display surfaces 114A 114C. Typically, switchable optics systems 108, 208, 308, 408, 508, and 608 also focus illumination lights onto the subsurfaces. Additionally switchable optics systems 108, 308, 408 and 608 may filter collimated white light 106. The switchable optics systems may be base on solid state switching techniques using acousto-optic materials, liquid crystals or alternatively, opto mechanical devices such as rotating prisims, mirrors, or gratings. In the preferred embodiment, the switchable optics systems are based on electrically switchable holographic optical technology.

Accordingly, the switchable optics systems described above includes an electrically switchable holographic optical element (ESHOE) system having at least three groups of three electrically switchable holographic elements that perform the illumination light directing functions described above. The ESHOE system may additionally perform the functions of filtering the collimated white light 106 to produce separated red, green, and blue illumination lights, or focusing the illuminations lights onto the subsurfaces of display surface 114. Additionally, the ESHOE system may perform the functions of light shaping and light correction. However, these last functions are preferably performed by conventional optics embodied in glass or plastic separate and apart from the ESHOE system. The function of focusing the illumination light onto the subsurfaces of the image display may also be performed by conventional optics.

Figure 11:
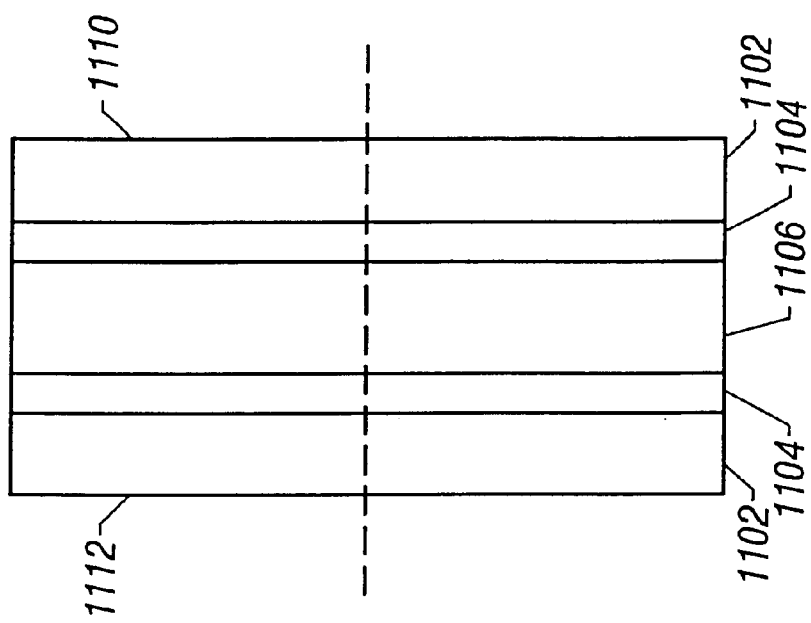
FIG. 11 is a cross sectional view of an electrically switchable holographic optical element.

FIG. 11 shows the cross-sectional view of an exemplary switchable holographic optical element that can be used in the ESHOE system. The switchable holographic optical element of FIG. 11 includes a pair of substantially transparent and electrically non-conductive layers 1102, a pair of substantially transparent and electrically conductive layers 1104, and a switchable holographic layer 1106 formed, in one embodiment, from the polymer dispersed liquid crystal material described in U.S. patent application Ser. No. 09/478,150 entitled Optical Filter Employing Holographic Optical Elements And Image Generating System Incorporating The Optical Filter, filed Jan. 5, 2000, which is incorporated herein by reference. In one embodiment, the substantially transparent, electrically non-conductive layers 1102 comprise glass, while the substantially transparent, electrically conductive layers 1104 comprise indium tin oxide (ITO). An anti-reflection coating (not shown) may be applied to selected surfaces of the switchable holographic optical element, including surfaces of the ITO and the electrically nonconductive layers, to improve the overall transmissive efficiency of the optical element and to reduce stray light. As shown in the embodiment of FIG. 11, all layers 1102–1106 are arranged like a stack of pancakes on a common axis 408. The layers may be flexible.

Layers 1102–1106 may have substantially thin cross-sectional widths, thereby providing a substantially thin aggregate in cross-section. More particularly, switchable holographic layer 1106 may have a cross-sectional width of 5–12 microns (the precise width depending on a spectral bandwidth and required diffraction efficiency), while nonconductive glass layers 1102 may have a cross-sectional width of 0.4–0.8 millimeters. Obviously, ITO layers 1104 must be substantially thin to be transparent. It should be noted that holographic layers may be deposited on thin plastic substrates. The plastic substrates may also be flexible.

With ITO layers 1104 coupled to a first voltage, an electric field is established within the switchable holographic layer 1106, and the switchable holographic element operates in the inactive state described above. However, when the ITO layers 1104 are coupled to a voltage below the first voltage, the switchable holographic optical element operates in the active state as described above. When active, the electrically switchable holographic optical element diffracts, for example, the red bandwidth component of collimated incident light 112 while passing the remaining components of collimated incident light 112, including green and blue bandwidth components, without substantial alteration.

The switchable holographic optical element shown in FIG. 11 may be reflective or transmissive type. FIG. 11 shows the switchable holographic optical element with oppositely facing front and back surfaces 1110 and 1112. Whether reflective or transmissive type, collimated white light 106 falls incident on the front surface 1110 at normal incidence angle. If the switchable holographic optical element is configured as transmissive type, diffracted light components emerge from back surface 1112. In contrast, if the electrically switchable holographic optical element is configured as reflective type hologram, diffracted light components emerge from front surface 1110. Transmissive type electrically switchable holographic optical elements can be employed in the switchable optics systems shown in FIGS. 1, 2 and 3, while reflective type electrically switchable holographic optical elements can be employed in the switchable optics systems shown in FIGS. 4, 5 and 6.

Switchable holographic layer 1106 records a hologram using conventional techniques. In one embodiment, the resulting hologram is characterized by a high diffraction efficiency and a fast rate at which the optical element can be switched between active and inactive states. In the embodiment of switchable holographic layer 1106 formed from polymer dispersed liquid crystal (PDLC) material, the recorded hologram can be switched from a diffracting state to a transmitting state with the creation and elimination of the electric field mentioned above. Preferably, the holograms recorded in the switchable holographic layer 1106 would be Bragg (also know as thick or volume phase) type in order to achieve high diffraction efficiency. Raman-Nath or thin phase type holograms may also be employed.

The hologram recorded in switchable holographic layer 1106 can be based on PDLC materials described in the Ser. No. 09/478,150 application which, as noted above, is incorporated herein by reference. The hologram, in one embodiment, results in an interference pattern created by recording beams, i.e., a reference beam and an object beam, interacting within switchable holographic layer 1106. Interaction of the beams with the PDLC material causes photopolymerization. Liquid crystal droplets become embedded in the dark regions of the fringe patterns that are formed by the intersection of the recording beams during the recording process. Stated differently, the recording material may be a polymer dispersed liquid crystal mixture which undergoes safe separation during the recording process, creating regions densely populated by liquid crystal microdroplets, interspersed by regions of clear photopolymer. When a voltage of sufficient magnitude is supplied to ITO layers 1104, the liquid crystal droplets reorient and change the refractive index of the switchable holographic layer 1106, thereby essentially erasing the hologram recorded therein so that all collimated white light 106 incident thereon passes without noticeable alteration. The material used within switchable holographic layer 1106 is configured to operate at a high switching rate (e.g., the material can be switched in tens of microseconds, which is very fast when compared with conventional liquid crystal display materials) and a high diffraction efficiency.

Figure 12:
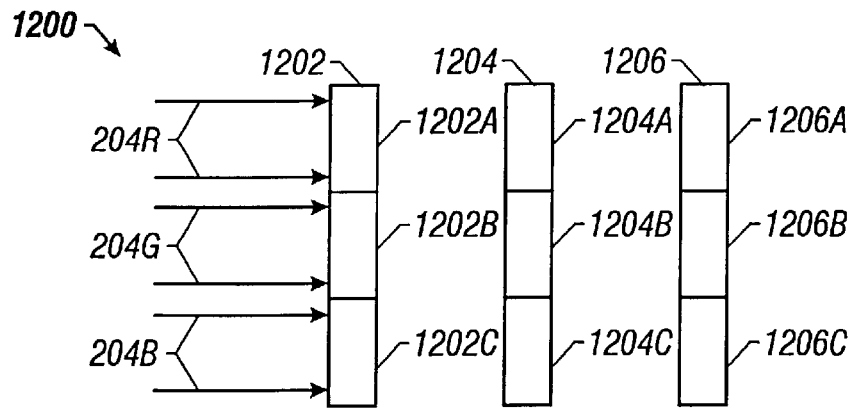
FIG. 12 is one embodiment of an electrically switchable holographic optical element system employable in the switchable optics system of FIGS. 2, 3, 5, and 6.

FIG. 12 is a block diagrams representing an embodiment of an ESHOE system employable in the switchable optics system used in FIGS. 2 and 3. More particularly, the ESHOE system shown in FIG. 12 includes three groups of three electrically switchable holographic optical elements. The first group, designated 1202, consists of three holographic optical elements 1202A–1202C stacked one upon another. The second group of holographic optical elements, designated 1204, consists of three holographic optical elements 1204A–1204C stacked one upon another. The third group of holographic elements, designated 1208, consists of three holographic optical elements 1208A–1208C stacked one upon another.

In operation, the ESHOE system shown in FIG. 12 is used to direct the red, green, and blue illumination lights onto the subsurfaces 114A–114C, as shown in FIGS. 7A through 7C. During each stage in the three-stage cycle described with reference to FIGS. 7A through 7C, each of the electrically switchable holographic optical elements in one of the three groups 1202 through 1208 is activated. More particularly, stage one described above is implemented by activating the electrically switchable holographic optical elements 1202A through 1202C of group 1202. The second stage of the illumination cycle described above is implemented by activating the electrically switchable holographic optical elements 1204A–1204C of group 1204. The third stage in the three-stage cycle described above is implemented by activating each of the electrically switchable holographic optical elements 1208A–1208C of the third group 1208. Illumination control circuit 118 sequentially and cyclically activates and deactivates groups 1202 through 1208 by providing the appropriate activation or deactivation voltages thereto so that only one group is activated at any one point in time.

With reference to FIG. 2, electrically switchable holographic optical elements 1202A, 1204A and 1208A diffract output light 204R when activated onto subsurfaces 114A, 114B and 114C, respectively. Electrically switchable holographic optical elements 1202B, 1204B and 1208B, when activated, diffract the output light 204G onto subsurfaces 114B, 114C and 114A, respectively. Activated holographic optical elements 1202C, 1204C, and 1208C diffract output light 204B onto subsurfaces 114C, 114B and 114A, respectively.

With continuing reference to FIG. 12 and with further reference to FIG. 3, electrically switchable holographic optical elements 1202A, 1204A and 1204A diffract the red bandwidth component of collimated white light 106 onto subsurface 114A, 114B and 114C, respectively, while passing the remaining components of collimated white light 106 incident thereon without substantial alteration. The portions of collimated white light 106 which pass through activated electrically switchable holographic optical elements enter free space and do not fall incident upon the display surface 114. This is because diffracted light emerges from the electrically switchable holographic optical element at an angle with respect to the light that passes without substantial alteration, and the display surface is positioned to take advantage of this fact. Electrically switchable holographic optical elements 1202B, 1204B and 1208B diffract the green bandwidth portion of collimated white light 106 incident thereon, the diffracted light falling incident upon subsurfaces 114B, 114C, and 114A, respectively. The remaining portions of collimated white light 106 incident upon activated optical elements 1202B, 1204B, and 1208B, transmit therethrough without substantial alteration and enter free space. Likewise activated optical elements 1202C, 1204C, and 1208C diffract the blue bandwidth component of collimated white light 106 incident thereon, the diffracted blue bandwidth component falling incident upon subsurfaces 114C, 114B and 114A, respectively.

Figure 13:
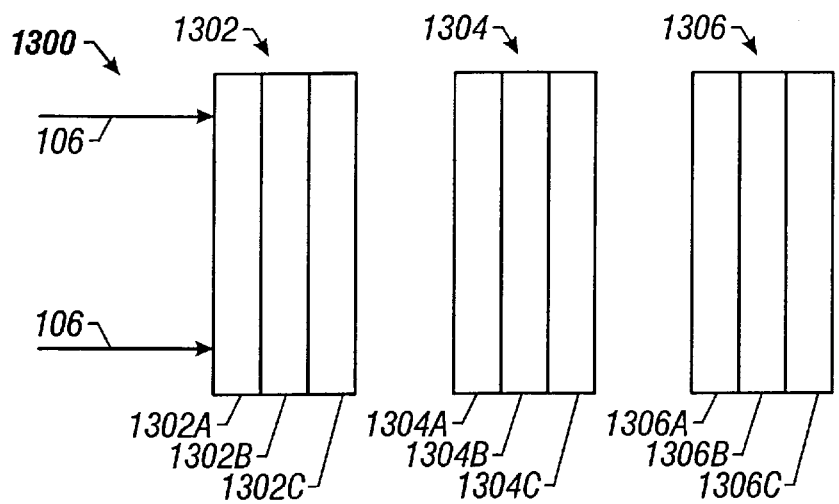
FIG. 13 is one embodiment of an electrically switchable holographic optical element system employable in the switchable optics system of FIGS. 1 and 4.

FIG. 13 shows an ESHOE system for use in the embodiments of FIGS. 1 and 4. The ESHOE system of FIG. 13 includes three groups of three electrically switchable holographic optical elements. The first group 1302 includes three electrically switchable holographic optical elements 1302A, 1302B and 1302C, each of which is configured to diffract red bandwidth light when active while transmitting green and blue bandwidth light without alteration. When deactivated, each of the electrically switchable holographic optical elements 1302A, 1302B, and 1302C passes the red, green, and blue bandwidths without alteration. Diffracted red bandwidth light emerges from electrically switchable holographic optical elements 1302A, 1302B and 1302C at distinct exit angles to illuminate subsurfaces 114A–114C, respectively.

The second group 1304 includes three electrically switchable holographic optical elements 1304A, 1304B and 1304C, each of which is configured to diffract green bandwidth light when active while transmitting red and blue bandwidth light without alteration. When deactivated, each of the electrically switchable holographic optical elements 1304A, 1304B and 1304C passes the red, green, and blue bandwidths without alteration. The second group 1304 includes three electrically switchable holographic optical elements 1304A, 1304B and 1304C, each of which is configured to diffract green bandwidth light when active while transmitting red and blue bandwidth light without alteration. When deactivated, each of the electrically switchable holographic optical elements 1304A, 1304B and 1304C passes the red, green, and blue bandwidths without alteration. Diffracted green bandwidth light emerges from electrically switchable holographic optical elements 1304A, 1304B, and 1304C at distinct exit angles to illuminate subsurfaces 114A through 114C, respectively.

The third group 1306 includes three electrically switchable holographic optical elements 1306A, 1306B and 1306C, each of which is configured to diffract blue bandwidth light when active while transmitting red and green bandwidth light without alteration. When deactivated, each of the electrically switchable holographic optical elements 1306A, 1306B, and 1306C passes the red, green, and blue bandwidths without alteration. Diffracted blue bandwidth light emerges from electrically switchable holographic optical elements 1306A, 1306B, and 1306C at distinct exit angles to illuminate subsurfaces 114A through 114C, respectively.

The ESHOE system shown in FIG. 13, acting under control of control circuit 118, operates to illuminate the display surface 114 as shown in FIGS. 7A through 7C. In this mode, control circuit activates only one electrically switchable holographic optical element in each of the groups 1302 through 1306. More particularly, the control circuit in the first cycle activates electrically switchable holographic optical elements 1302A, 1304B, and 1306C to illuminate display surface 114 as shown in FIG. 7A. Control circuit in the second cycle activates electrically switchable holographic optical elements 1302C, 1304A, and 1306B to illuminate display surface 114 as shown in FIG. 7B. Control circuit in the third cycle activates electrically switchable holographic optical elements 1302B, 1304C, and 1306A to illuminate display surface 114 as shown in FIG. 7C.

Figure 14:
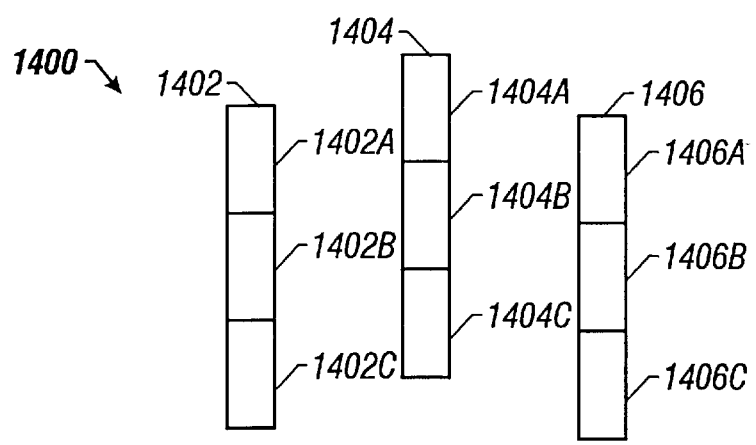
FIG. 14 is one embodiment of an electrically switchable holographic optical element system employable in the switchable optics system of FIGS. 3 and 6.

FIG. 14 shows the ESHOE system of FIG. 12 with the electrically switchable holographic optical elements stagered. The ESHOE of FIG. 14 can be used to direct collimated white light 106.

The switchable optics systems can employ a pair of the ESHOE systems described in FIGS. 12 and 13 to increase the intensity of illumination lights for illuminating the monochromatic components of the display surface. More particularly, the ESHOE system of FIG. 13 or 14 could be duplicated, the two ESHOE systems placed side by side with a polarization rotator in between. In this arrangement, each of the s and p polarized components of collimated light 106 or the output lights 204R–204B will be diffracted by one of the two ESHOE systems with the rotator therebetween. Alternatively, the ESHOE system of FIG. 13 or 14 could be duplicated and placed side by side, with the diffraction gratings in each of the electrically switchable holographic optical elements of one of the ESHOE systems aligned orthogonal to the diffraction gratings of each electrically switchable holographic optical elements of the other ESHOE system. These arrangements are more fully described in U.S. patent application Ser. No. 09/478,150 which is incorporated herein in its entirety.

Figure 15:
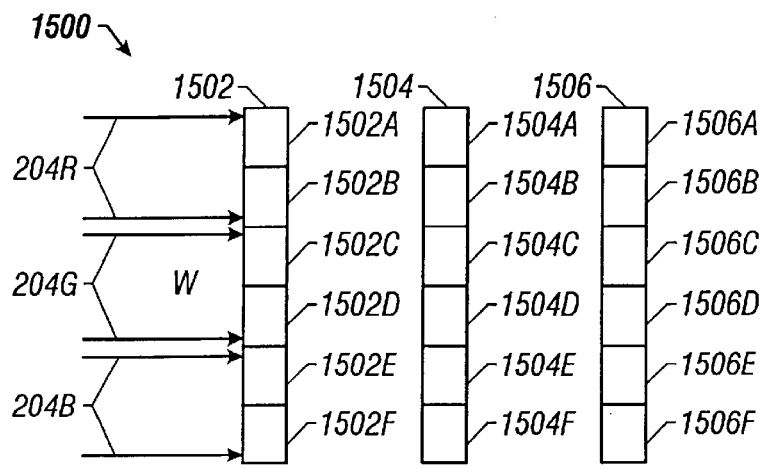
FIG. 15 is another embodiment of an electrically switchable holographic optical element system employable in the switchable optics system of FIGS. 2, 3, 5, and 6.
Figure 16:
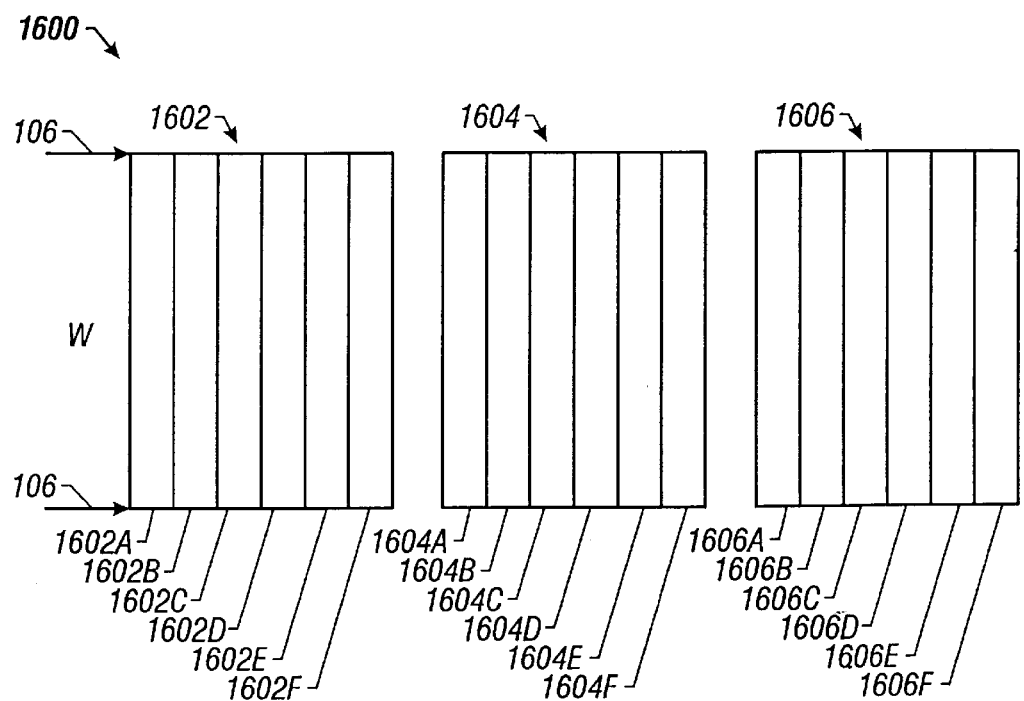
FIG. 16 is another embodiment of an electrically switchable holographic optical element system employable in the switchable optics system of FIGS. 1 and 4.

The ESHOE systems above are employable to illuminate a display surface divided into three separate subsurfaces with R, G, and B illumination lights. Alternative ESHOE systems may be employed, for example, to illuminate a display surface divided into six separate subsurfaces as shown in FIGS. 9A–9F. FIGS. 15 and 16 show ESHOE systems which can be employed to produce the illumination patterns shown in FIGS. 9A–9F. The ESHOE system of FIG. 15 is employable in the systems of FIGS. 2 and 5 while the ESHOE system of FIG. 15 is employable in the systems of FIGS. 1, 3, 4 and 6. In general, the total number of electrically switchable holographic optical elements needed in each ESHOE system (configured to diffract only one of the s or p polarization components of collimated light 106 or output lights 204R–204B) equals the number of distinct illumination lights (normally three) multiplied by the number of subsurfaces of the display surface 114 that display monochromatic components of the final image.

Figure 17:
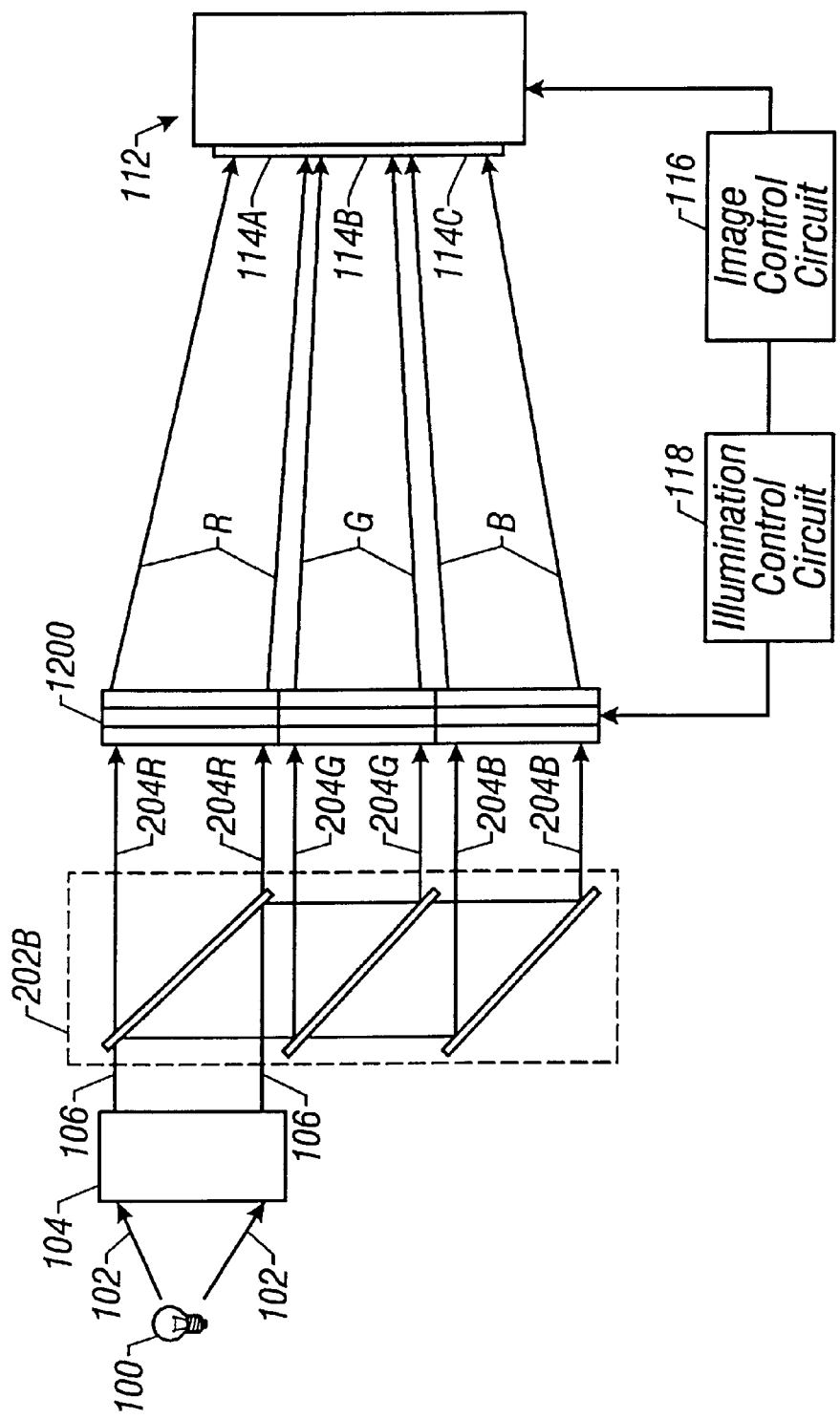
FIG. 17 illustrates one embodiment of the system shown in FIG. 2.

FIG. 17 shows one embodiment of the system shown in FIG. 2. FIG. 17 shows 202B receiving collimated white light 106 from collimation lens 104. Filtered output lights 20R–204B are subsequently received by ESHOE system 1200. As noted in FIG. 12, ESHOE system 1200 comprises three stacks of electrically switchable holographic optical elements stacked one upon another. Each of these elements directs and focuses a respective wavelength band of output light received from the filter 202B onto one of the subsurfaces 114A–114C. The situation shown in FIG. 17 is achieved by illumination control circuit 118 activating the electrically switchable holographic optical elements 1202A–1202C (see FIG. 12) and deactivating electrically switchable holographic optical elements 1204A–1204C and 1206A–1206C.

Figure 18:
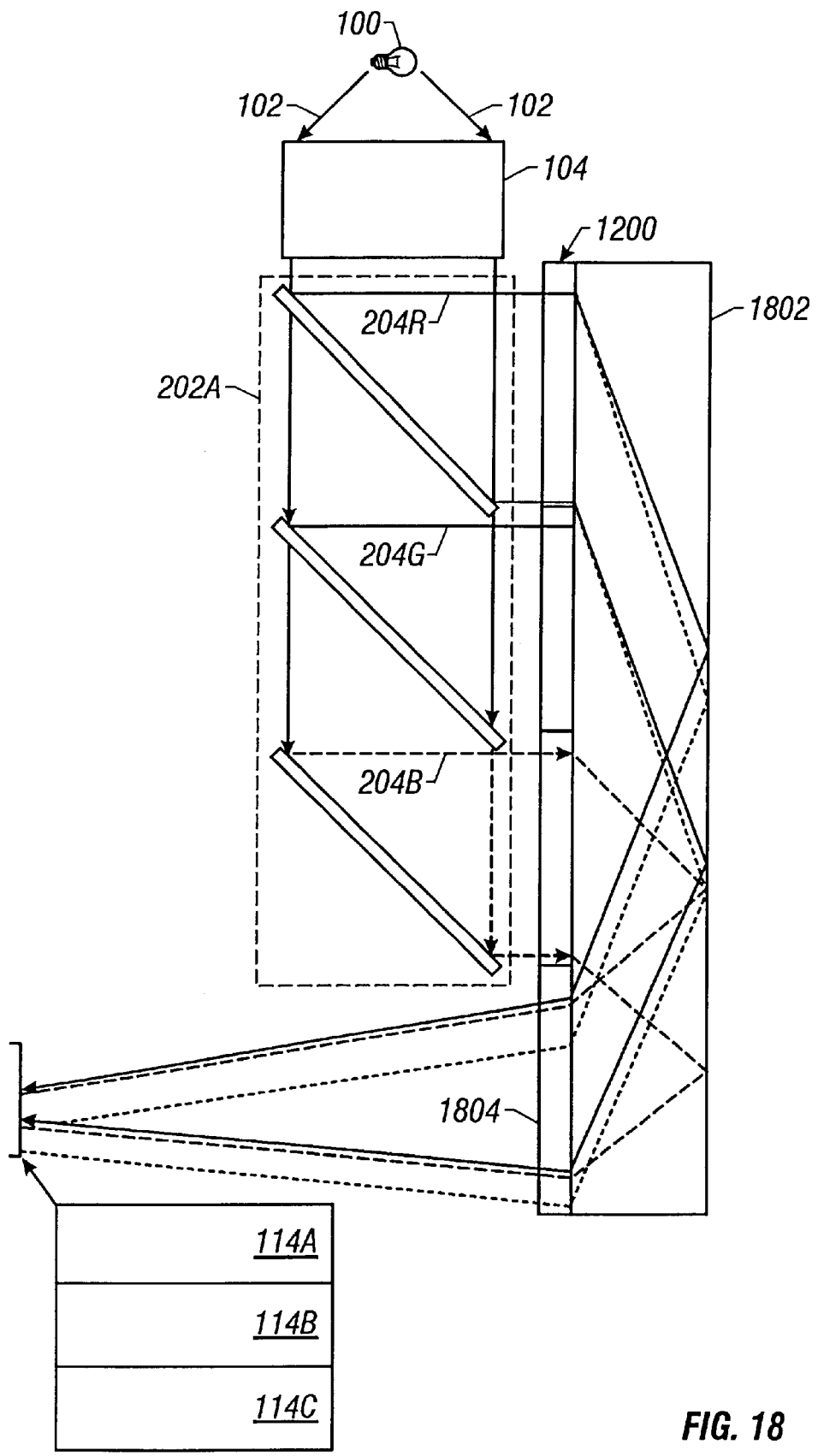
FIG. 18 illustrates another embodiment of the system shown in FIG. 2.

FIG. 18 shows a another embodiment of the system shown in FIG. 2. In this embodiment, light from an source 100 is collimated and projected onto filter 202A. The output lights 204R–204B are received and redirected by ESHOE system 1200 mounted on the front surface of a transparent (e.g. glass) plate 1802 to produce illumination lights. After being redirected, the illumination lights are totally internally reflected by a rear face of the plate 1802 and are incident upon a device 1804 (also mounted on the front of the plate 1802) which focuses the illumination lights and corrects chromatic dispersion in the latter. The illumination lights are then projected on to subsurfaces 114A–114C. With reference to FIG. 12, the ESHOE system 1200 of FIG. 18 includes three stacks of three electrically switchable holographic optical elements. Illumination control circuit (not shown in FIG. 18) activates the electrically switchable holographic optical elements in only one stack to illuminate the subsurfaces.

Because the electrically switchable holographic optical elements of ESHOE system 1200 operate off-axis and over appreciable spectral bandwidths, some correction of chromatic and geometrical aberration will be necessary, and this function is performed by the device 1804. In a particular example, device 1804 comprises a stack of holographic diffraction elements which are designed to act on red, green and blue bandwidth light, respectively. Because the angular separation between R, G, and B illumination lights is relatively large (indeed, larger than the angular bandwidth of the Bragg holograms in these elements), the Bragg angular and wavelength selectivity will be sufficient to ensure that there is no appreciable cross-talk between the red, green and blue wavelengths. Under these circumstances, there is no need for these elements of device 1804 to be made switchable on and off.

As noted above, electrically switchable holographic optical elements will act efficiently only on the p-polarised component of the incident light, with the s-polarised component being substantially unaffected, i.e. undiffracted by the electrically switchable holographic optical elements. As a consequence, half of the available light power will be lost. To prevent this from happening, the single ESHOE system 1200 of FIG. 18 can be replaced with a pair of ESHOE systems 1200 and a polarisation rotator optically interposed therebetween. In this alternative embodiment, the p-polarised component of the light incident upon the electrically switchable holographic optical elements of the first ESHOE system is diffracted whilst the s-polarised component passes therethrough substantially unaffected. The polarisation rotator (which can be an achromatic half-wave plate) is designed to rotate by 90 degrees the polarisation direction of light passing therethrough. Thus, the p-polarised light diffracted by the first ESHOE system becomes s-polarised, whilst the undiffracted s-polarised light becomes p-polarised. On encountering the second ESHOE system, the (now) p-polarised component is diffracted whilst the (now) s-polarised component passes therethrough substantially unaffected. The properties of electrically switchable holographic optical elements in the two ESHOE systems are chosen such that the emission angle of diffracted light is the same in each case, so that both the p- and the s-polarised components are emitted in the same direction.

In an alternative arrangement, the polarisation rotator is omitted and instead the fringes of the holograms recorded in the electrically switchable holographic optical elements in the two ESHOE systems are arranged to be mutually crossed, so that the electrically switchable holographic optical elements in the first ESHOE system act on the p-polarised component whereas those in the second ESHOE system act on the s-polarised component. Again, the properties of the holograms in each ESHOE system are chosen such that the diffracted p- and s-polarised components are emitted in the same direction.

Figure 19:
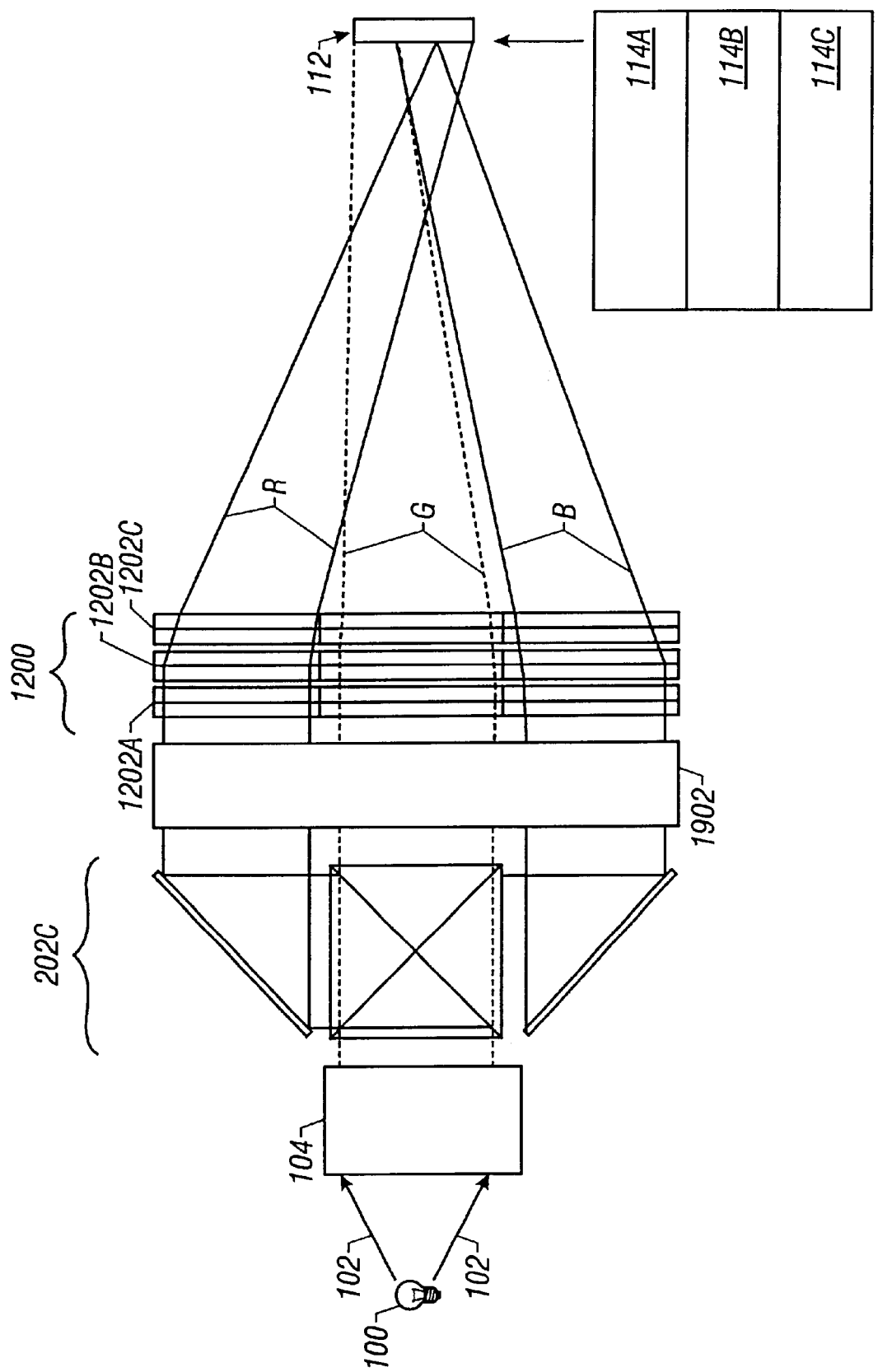
FIG. 19 illustrates still another embodiment of the system shown in FIG. 2.

FIG. 19 shows a further embodiment of the system shown in FIG. 2. Here filter 202C of FIG. 10C is employed to filter collimated white light received from collimation lens 104. Additionally, the switchable optics system includes the ESHOE 1200 and an optical corrector 1902 is optically interposed between the filter 202C and the ESHOE 1200, its purpose being to correct for aberrations introduced by the latter.

Figure 20:
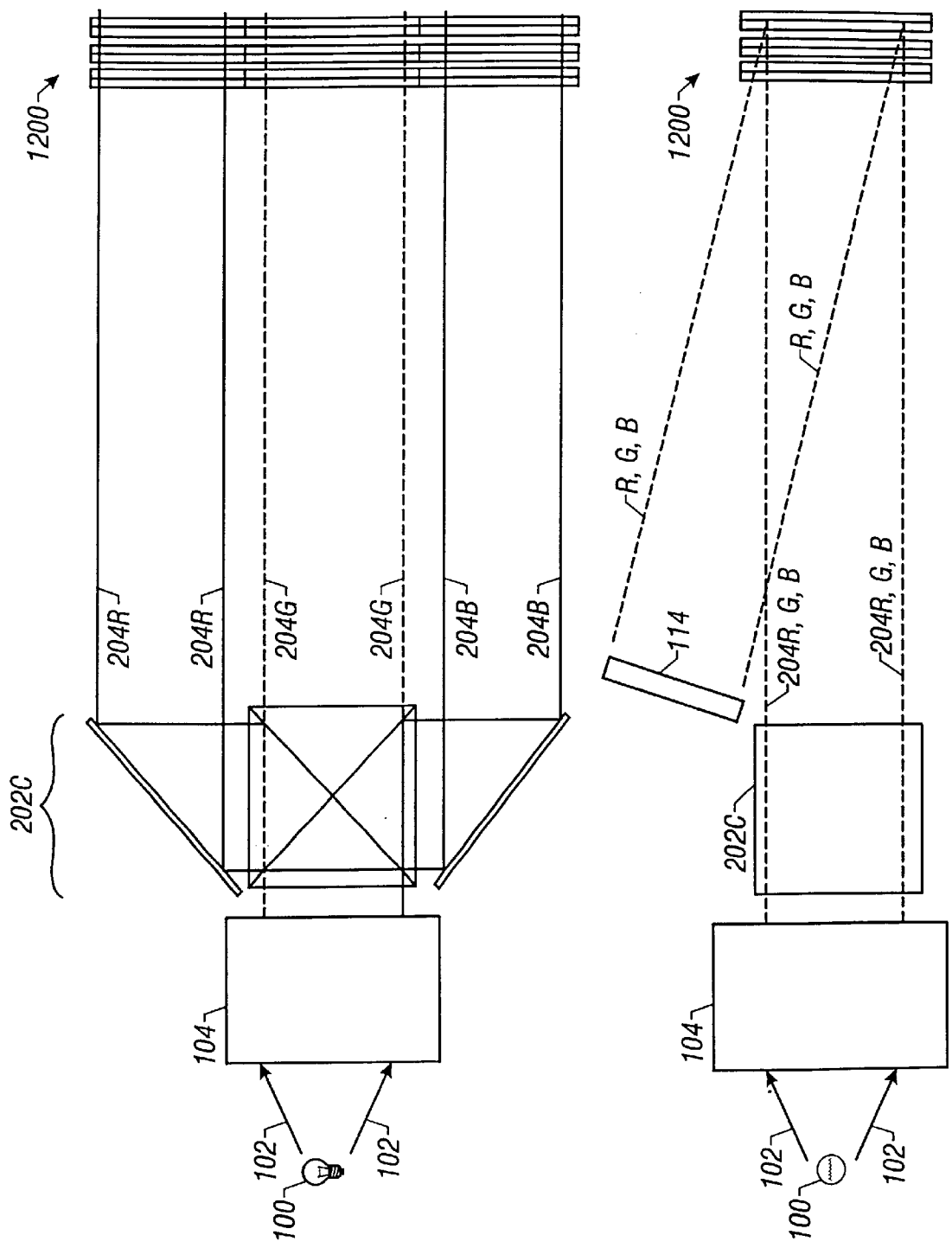
FIG. 20 illustrates one embodiment of the system shown in FIG. 5.

FIG. 20 shows a side view and a top view of an embodiment of the system shown in FIG. 5 in which a reflective ESHOE 1200. The system shown in FIG. 20 is similar to that shown in FIG. 19 in that filter 202C is employed to filter collimated light from collimation lens 104. The top view shows how output lights 204GR, G, and B are diffracted by ESHOE 1200 to produce illumination lights R, G, and B which subsequently illuminate display surface 114. Further, the top view shows that illumination lights (i.e. the diffracted output lights) emerge from ESHOE system at angle measured with respect to the angle at which output lights fall incident on the input surface of ESHOE system 1200. An appreciable diffraction angle is needed for the electrically switchable holographic optical elements to achieve high diffraction efficiency. Further, it is noted that reflective type electrically switchable holographic optical elements are not sensitive to the polarization state of the incident light at moderate incidence and diffraction angles. Accordingly, no special measures are needed to avoid polarization loses.

Figure 21:
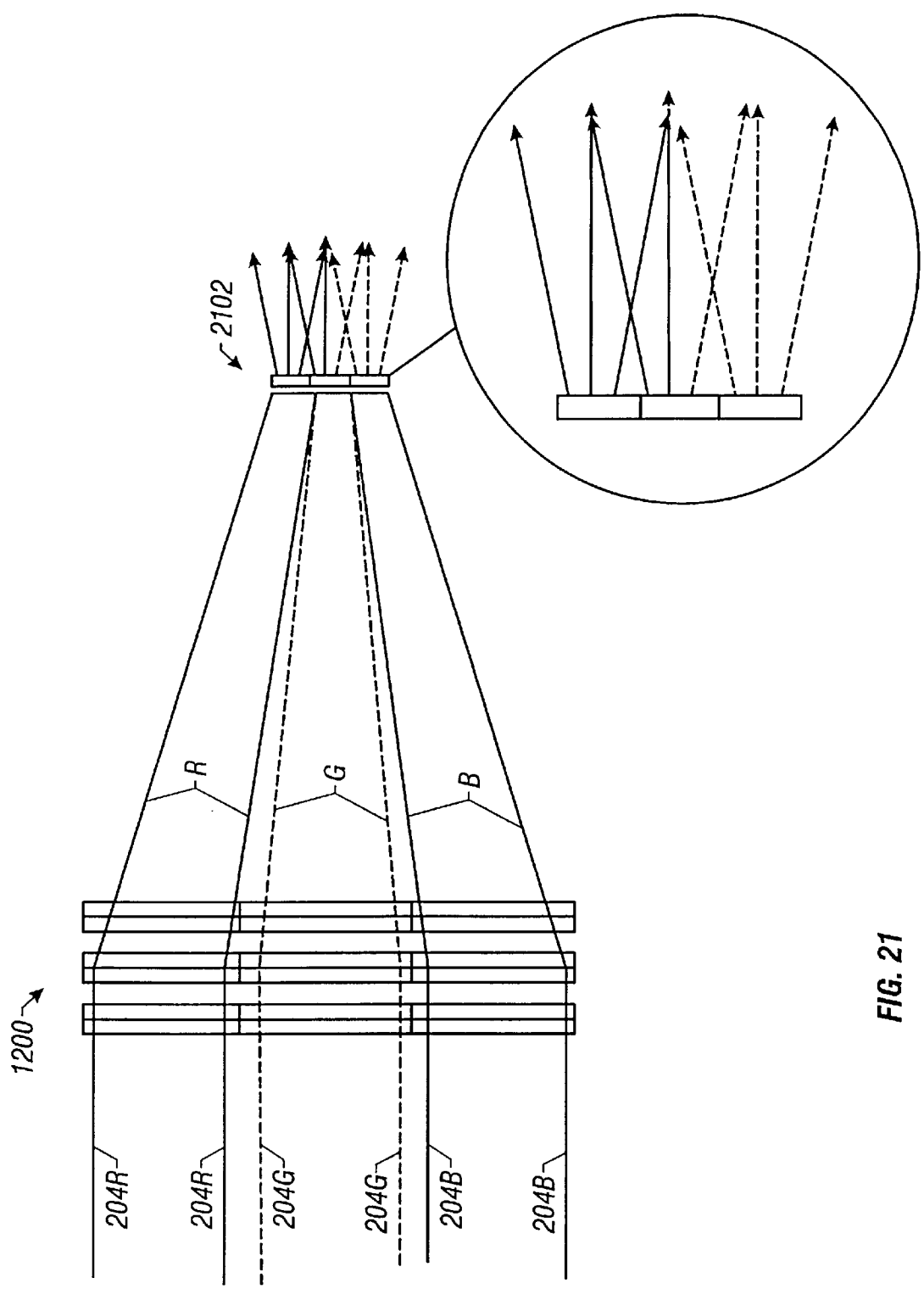
FIG. 21 illustrates an electrically switchable holographic optical element system and an optical diffuser employable in the embodiments shown in FIGS. 1–6.

FIG. 21 shows an arrangement where, instead of being directed to an image surface, illumination lights R, G, and B are projected on to an intermediate optical diffuser 2102. The diffuser can be used to control the beam characteristics to generate identical polar diagrams for the illumination light. The diffuser can be conventional, but is preferably a holographic light-shaping diffuser, which can be composed of a stack of non-switchable holographic optical elements.

Figure 22:
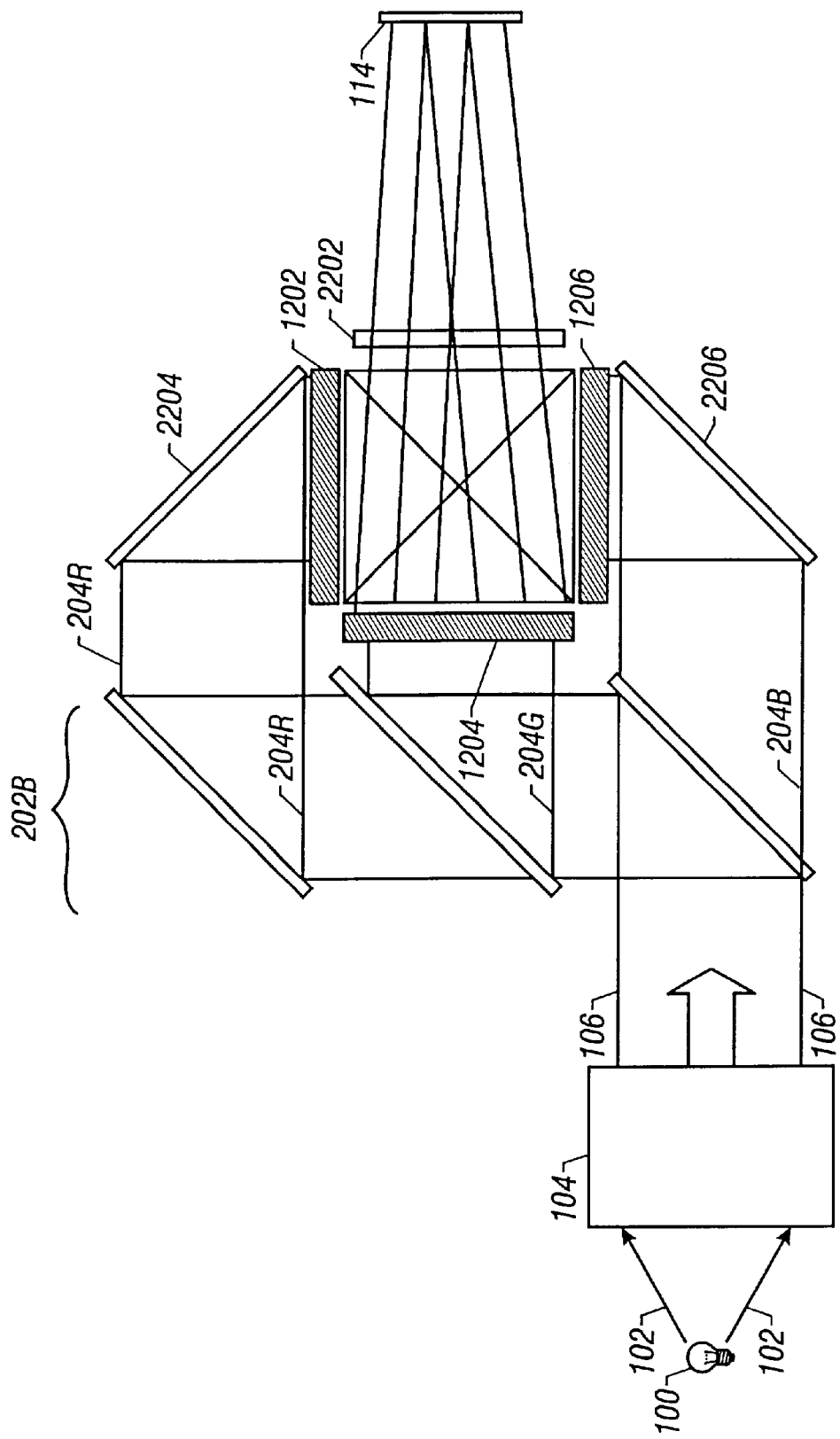
FIG. 22 illustrates an alternative embodiment of the switchable optics system employable in the embodiment of FIG. 2.
Figure 23:
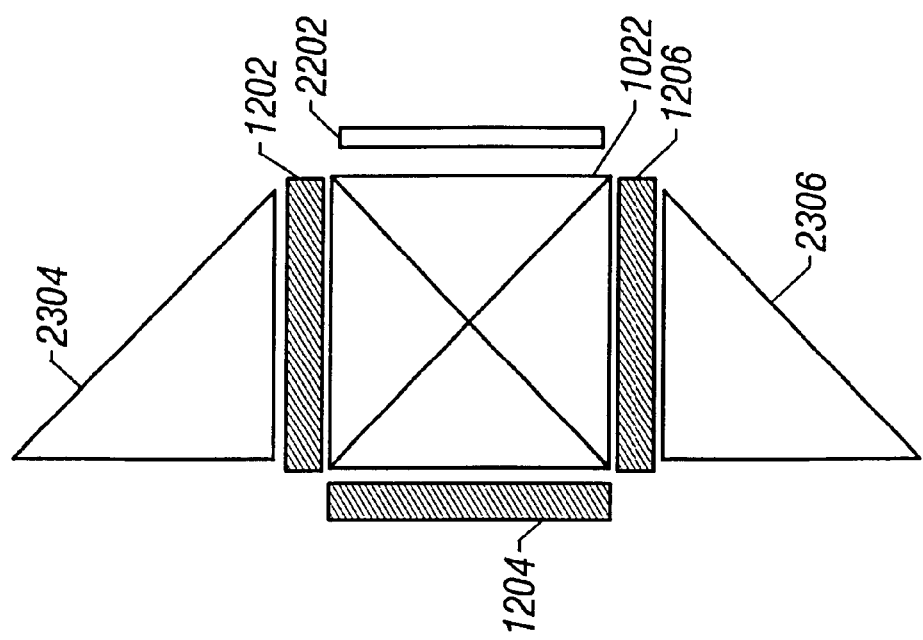
FIG. 23 illustrates the switchable optics system of FIG. 22 with a modification thereto.
Figure 24:
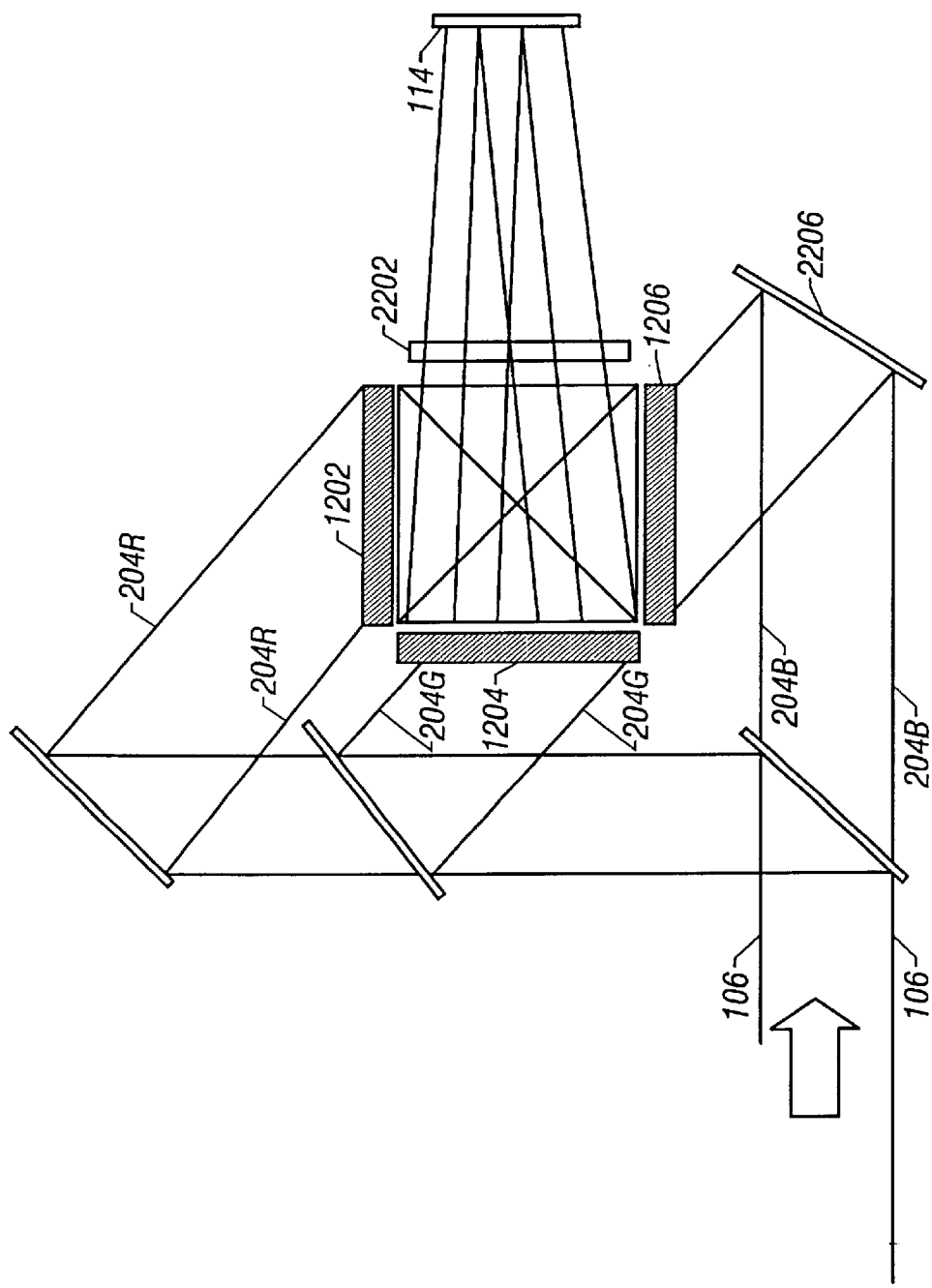
FIG. 24 illustrates the switchable optics system of FIG. 22 with a modification thereto.

FIG. 22 shows an alternative embodiment of the system shown in FIG. 2. The switchable optics system of FIG. 22 employs the ESHOE system 1200 of FIG. 12. However, the groups of electrically switchable holographic optical elements not arranged side by side. Rather, the groups of electrically switchable holographic optical elements 1202, 1204, and 1206 are individually positioned adjacent input faces of a dichroic prism. Collimated light 106 is filtered into output lights 204R–204B by filter 202B. Output light 204R is deflected 90 degrees by a plane mirror 2204 and falls incident upon an input face of the dichroic prism after being diffracted by one of the activated electrically switchable holographic optical elements in group 1202. Similarly, output light 204B is deflected 90 degrees by a plane mirror 2206 and falls incident upon another input face of the dichroic prism after being diffracted by. Output light 204G falls incident on a third input face of the dichroic prism after being diffracted by one of the activated electrically switchable holographic optical elements in group 1204. The dichroic prism redirects the diffracted lights (i.e., the illumination lights R, G, and B) to a color correction element 2202, disposed optically immediately after the output face of the dichroic prism, before illuminating image surface 114. FIG. 23 depicts a modification of the system shown in FIG. 22 in which the plane mirrors 2204 and 2206 are replaced by total internal reflection prisms 2304 and 2306. FIG. 24 illustrates a further embodiment of FIG. 22 in which the dichroic filter elements of filter 202B and the plane mirror 2206 are rearranged so that output lights 204R–204B fall incident on the groups of electrically switchable holographic optical elements 1202–1206, respectively, at an angle greater than 90 degrees. It is noted that plane mirror 2204 is removed from this alternative. In each case the output beams are angled so that diffracted light is emmitted normally to the output surfaces of the electrically switchable holographic optical elements.

The arrangement shown in FIG. 18 is such that the illumination lights incident at any point on the display surface, overlap exactly and appear to have been generated from a common point. This is an important requirement in many reflective display devices, where the brightness of the final projected image depends o specular reflection at the display rather than diffusion (as would be the case, for example, with transmissive LCDs). In embodiments described above, the output lights are not matched in this way and may need to be modified using diffusion screens (such as shown in FIG. 21) before they could be used to illuminate a reflective non-diffusing display.

Figure 25:
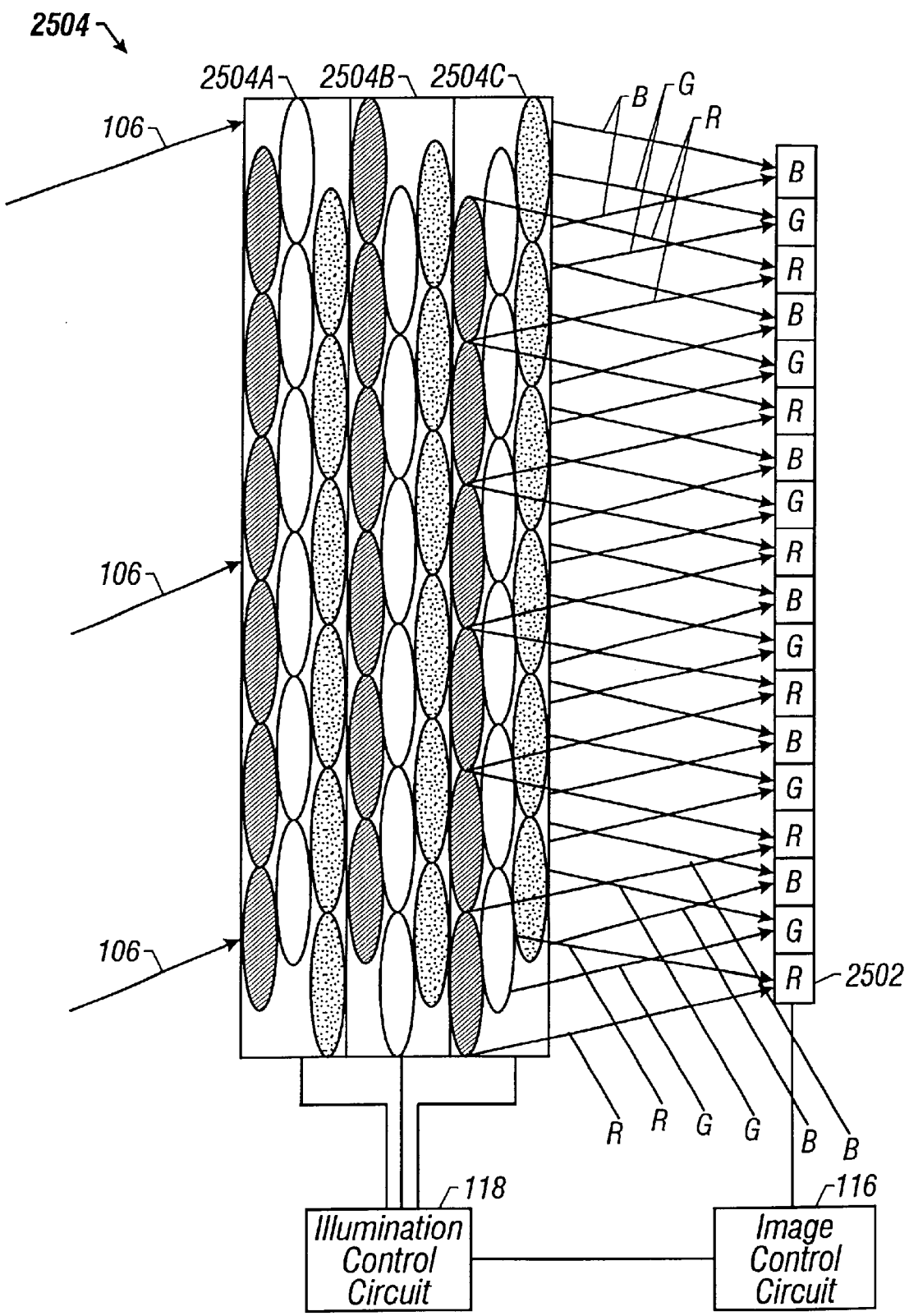
FIG. 25 shows a fourth embodiment of a transmissive type device for producing colored light and an image generating apparatus.

FIG. 25 shows an alternative embodiment employing the present invention. FIG. 25 shows image surface 114 comprises an array of pixels 2502. The pixels are divided among three sets, with pixels in each set being evenly distributed across the image surface 114. FIG. 25 shows is a cross sectional view of one line of pixels in the arrayed image surface. Image control circuit controls the display of monochrome images on surface 114 so that, at any time, the pixels in each set display (in monochrome) either the red, green, or blue component of the final image, and also such that the pixels in each set display these final image components in succession.

FIG. 25 also shows an ESHOE system 2504 having groups of three electrically switchable holographic optical elements 2504A–2504C used for illuminating the pixels with illumination lights R, G, or B. Although not shown, the number of groups of three electrically switchable holographic optical elements 2504A–2504C equals the number of pixels in a line of pixels. FIG. 25 shows one group of three electrically switchable holographic optical elements 2504A–2504C. Essentially, the ESHOE system 2504 receives collimated white light 106 from a collimation lens (not shown). ESHOE 2504 filters, directs, and focuses the collimated white light 106 by diffraction to illuminate each of pixels with R, G, or B illumination light. The red illumination lights R are directed to those pixels 2502 which are, at the time, displaying red monochromatic components of the final image. The green illumination lights G are directed to those pixels 2502 which are, at the time, displaying green monochromatic components of the final image. The blue illumination lights B are directed to those pixels 2502 which are, at the time, displaying blue monochromatic components of the final image.

ESHOE system 2504 is controlled by circuit 118 so that only one of the electrically switchable holographic optical elements 2504A–2504C in each group is active at a given point in time. Moreover, control circuit is in synchronism with image control circuit 116 so that only those pixels 2502 displaying red, green, or blue monochrome components of the final image are illuminated with R, G, or B illumination light.

Each of the electrically switchable holographic optical elements 2504A–2504C in each group, includes three stacks of holographic lenses (preferably microlenses) formed in the holographic recording medium therein. The lenses in each stack operate on the red, green, and blue bandwidth components, respectively, of collimated light 106 when activated by the appropriate signal generated by illumination control circuit 118. In FIG. 25, each of the holographic lenses that diffract red bandwidth light is shown cross hatched, each of the holographic lenses that diffract green bandwidth light is shown plain, and each of the holographic lenses that diffract blue bandwidth light is shown dotted. The three stacks of lenses in each electrically switchable holographic optical element are positioned between a pair of electrode (ITO) layers so that all lenses therebetween are activated by the control signal provided to the pair of electrodes by the control circuit 118. Alternatively, each stack of lenses, or each lens in the electrically switchable holographic optical elements may be separately switchable into or out of the active state. However, such an alternative embodiment requires that each separate lens or each separate stack of lenses by sandwiched between its own set of ITO layers.

Figure 26A:
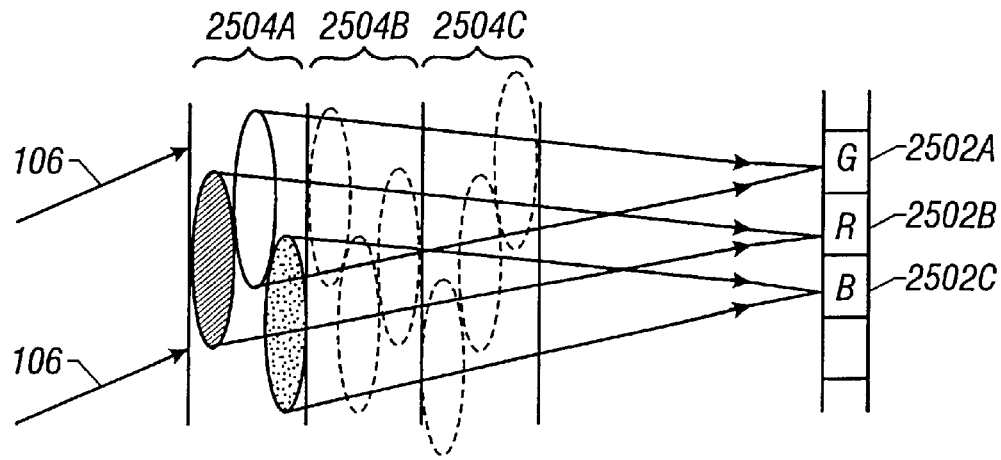
FIG. 26 illustrates operational aspects of the transmissive type device for producing colored light shown in FIG. 25.
Figure 26B:
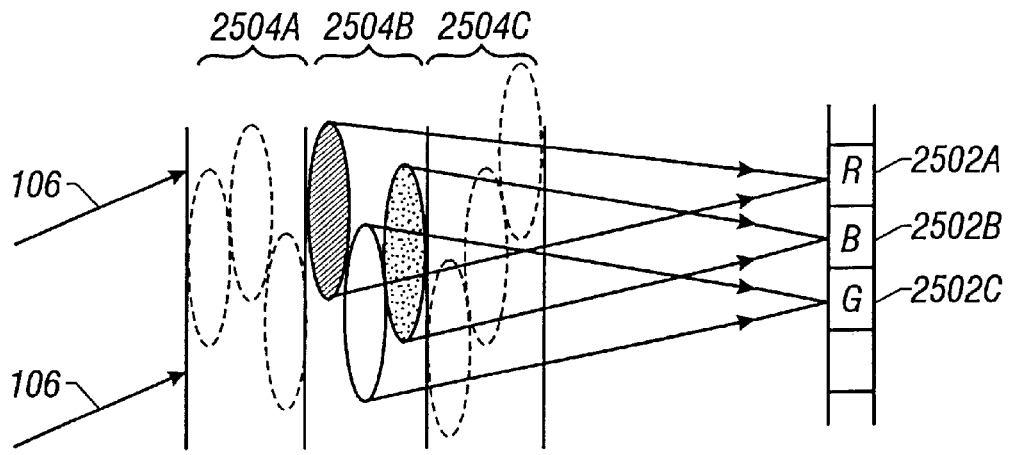
Figure 26C:
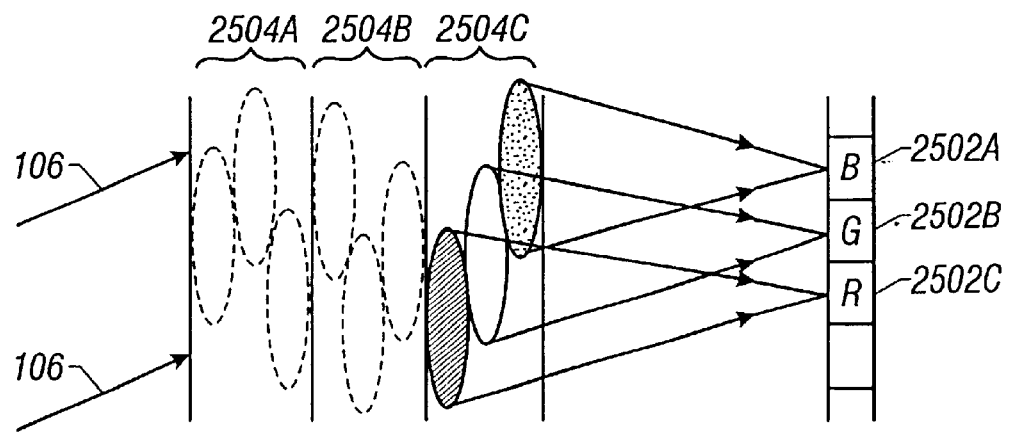

FIGS. 26A–26C illustrate operational aspects of the ESHOE system 2504 shown in FIG. 25. FIGS. 26A–26C show only pixels 2502A–2502C and one holographic lens from the lens stack of each of the electrically switchable holographic optical elements of groups 2504A–2504C. FIG. 26A shows a first stage of a three stage cycle in which pixels 2502A–2502C display green, red, and blue monochrome components, respectively, of the final image. Also in this stage, the holographic lenses in the first group 2504A are all activated by control circuit 118 so that the red lens contained in first group 2504A directs and focuses the red bandwidth component of collimated white light 106 incident thereon onto pixels 2502A while passing light of other bandwidths incident thereon without noticeable alteration, the green lens contained in first group 2504A directs and focuses the green bandwidth component of collimated white light 106 incident thereon onto pixels 2502B while passing light of other bandwidths incident thereon without noticeable alteration, and the blue lens contained in first group 2504A directs and focuses the blue bandwidth component of collimated white light 106 incident thereon onto pixels 2502C while passing light of other bandwidths incident thereon without noticeable alteration. Lenses shown in broken lines are deactivated by control circuit 118. These lenses pass all incident light with out substantial alteration.

In the second stage of the three stage cycle illustrated in FIG. 26B, pixels 2502A–2502C display red, blue, and green monochrome components, respectively, of the final image. Also in this stage, the holographic lenses in the second group 2504B are all activated by control circuit 118 so that the red lens contained in first group 2504B directs and focuses the red bandwidth component of collimated white light 106 incident thereon of pixels 2502A while passing light of other bandwidths incident thereon without noticeable alteration, the green lens contained in first group 2504B directs and focuses the green bandwidth component of collimated white light 106 incident thereon onto pixels 2502C while passing light of other bandwidths incident thereon without noticeable alteration, and the blue lens contained in first group 2504B directs and focuses the blue bandwidth component of collimated white light 106 incident thereon onto pixels 2502B while passing light of other bandwidths incident thereon without noticeable alteration.

In the last stage of the three stage cycle illustrated in FIG. 26C, pixels 2502A–2502C display blue, green, and red monochrome components, respectively, of the final image. Also in this stage, the holographic lenses in the second group 2504C are all activated by control circuit 118 so that the red lens contained in first group 2504C directs and focuses the red bandwidth component of collimated white light 106 incident thereon onto pixels 2502C while passing light of other bandwidths incident thereon without noticeable alteration, the green lens contained in first group 2504C directs and focuses the green bandwidth component of collimated white light 106 incident thereon onto pixels 2502B while passing light of other bandwidths incident thereon without noticeable alteration, and the blue lens contained in first group 2504C directs and focuses the blue bandwidth component of collimated white light 106 incident thereon onto pixels 2502A while passing light of other bandwidths incident thereon without noticeable alteration.

The three stage cycle is then repeated for the next final images, with the switching between the various stages being performed rapidly. In this fashion the image surface 114 is perceived by a viewer as displaying a full color image, and with the red, green and blue components of collimated white light 114 being fully used at all times. It is to be understood that, where a particular pixel displays at any given time a part of the final image where one or more of the monochromatic components are missing, then no illumination light is directed and focused onto that pixel during that particular operation, then no light of those particular color(s) is focused onto that pixel during that particular cycle. For example, if a given pixel displays a part of the image having only a red spectral component, then no green or blue illumination light is focused thereon.

Figure 27:
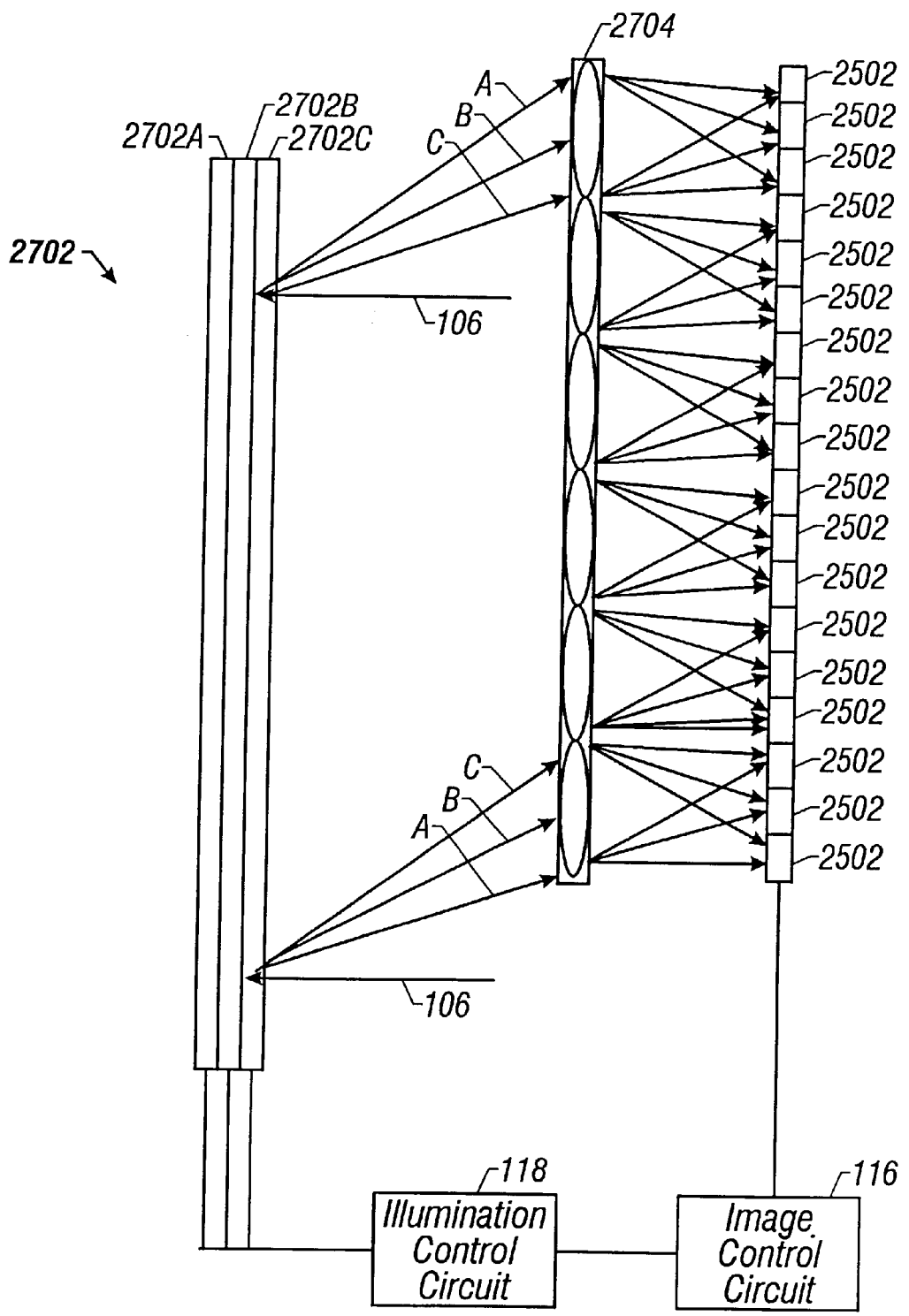
FIG. 27 shows a fourth embodiment of a reflective type device for producing colored light and an image generating apparatus.

A further embodiment of the image generating apparatus is shown in FIG. 27, where the image surface 114 is pixellated like that described in FIG. 25 and operates under the action of control circuit 116. In this embodiment, however, collimated light 106 is reflected by ESHOE system 2702 towards a directing device 2704, which then directs red, green and blue illumination lights onto the pixels 2502.

More particularly, the ESHOE system 2702 is composed of three reflective, electrically switchable holographic optical elements. In one embodiment, electrically switchable holographic optical elements 2702A–2702C can be arranged similar to that shown in FIG. 25 save that each group of electrically switchable holographic optical element consists of three arrays of holographic mirrors. In an alternative each electrically switchable holographic optical element can be embedded as three large holographic mirrors. It should be understood that reflective electrically switchable holographic optical elements operate in a manner similar to mirrors in that light emits from the same surface that receives the incident light. However, reflective electrically switchable holographic optical elements operate by diffracting incident light, the diffracted light emitting from the same surface that receives the incident light.

Each of the electrically switchable holographic optical elements is arranged to diffract the red, green and blue components of the light 106 at three predetermined emission angles, as indicated by arrows A, B and C. Control circuit 118 activates each of the electrically switchable holographic optical elements 2702A–2702C in sequence, i.e. so that when one element is activated while the other two are deactivated. When the element 2702A is activated, red illumination light is emitted in the direction of arrow A whilst green and blue illumination light is emitted respectively in the direction of arrows B and C. When the element 2702B is activated, red illumination light is emitted in the direction of arrow B whilst green and blue illumination lights are emitted respectively in the direction of arrows C and A. When the element 2702C is activated, red light is emitted in the direction of arrow C whilst green and blue light is emitted respectively in the direction of arrows A and B.

The directing device 2704 comprises essentially a passive optical element (such as an array of prismatic elements, lens-like elements or holographic device) which deflects light incident thereon to a degree dependent upon its wavelength. The device 2704 is arranged to direct light received in the direction of arrow A onto one set of pixels 2502, and to direct light received in the direction of arrows B and C onto second and third sets of the pixels. These sets of pixels are controlled by the control circuit 116 such that each set displays at any given time either a "red", "green" or "blue" monochromatic component of the final image, with each set displaying all of these image components in sequence. Operation of the control circuits 116 and 118 is synchronized such that, by way of example, when electrically switchable holographic optical element 2702A is activated, device 2704 directs red light onto those pixels which are at the time displaying a red monochromatic component of the final image, and so on. Otherwise, operation of the apparatus of this embodiment is analogous to that described above with reference to FIG. 25.

In a preferred example of the above apparatus, the directing device 2704 is composed of a stack of three holographic elements each of which is optimised to act upon the re, green and blue wavelengths, respectively.

Whereas the invention has been described in relation to what are presently considered to be the most practicable and preferred embodiments, it is to be understood that the invention is not limited to the disclosed arrangements but rather is intended to cover various modification and equivalent construction included within the spirit and scope of the invention.

What is claimed is:

1. An apparatus comprising:
 a switchable optics system comprising a first group of electrically switchable holographic optical elements comprising first, second, and third electrically switchable holographic optical of which is electrically switchable between an active state and a deactive state, wherein each of the first, second, and third electrically switchable holographic optical elements is configured to diffract light incident thereon when operating in the active state, wherein each of the first, second, and third electrically switchable holographic optical elements transmits light incident thereon without substantial alteration when operating in the deactive state, and;
 a first control circuit coupled to the first, second and third electrically switchable holographic optical elements, wherein each of the first, second and third electrically switchable holographic optical elements is activated or deactivated by the control circuit;
 a display device comprising a display surface that displays an image, wherein the display surface is configured to receive light diffracted by the first, second, and third electrically switchable holographic optical elements on separate first, second, and third surface areas, respectively, of the display surface.

2. The apparatus of claim 1 wherein each of the first, second and third electrically switchable holographic optical elements is configured to diffract first bandwidth light incident thereon.

3. The apparatus of claim 2 wherein each of the first, second and third electrically switchable holographic optical elements is configured to be separately activated or deactivated by the first control circuit.

4. The apparatus of claim 3 wherein the first control circuit is configured to sequentially and cyclically activate and deactivate the first, second and third electrically switchable holographic optical elements so that only one of the first, second, and third electrically switchable holographic optical elements is active at any point in time.

5. The apparatus of claim 1 wherein each of the first, second and third electrically switchable holographic optical elements is configured to diffract first, second, and third bandwidth light incident thereon, respectively, wherein the first, second, and third bandwidth lights are distinct from each other.

6. The apparatus of claim 5 wherein the first, second, and third electrically switchable holographic optical elements are configured to be collectively activated or deactivated by the first control circuit.

7. The apparatus of claim 1 wherein each of the first, second, and third electrically switchable holographic optical elements comprises a holographic recording medium that records a hologram, wherein the holographic recording medium comprises:

a monomer dipentaerythritol hydroxypentaacrylate;

a liquid crystal;

a cross-linking monomer;

a coinitiator; and a photoinitiator dye.

8. The apparatus of claim 1 wherein each of the first, second, and third electrically switchable holographic optical elements comprises a hologram made by exposing an interference pattern inside a polymer-dispersed liquid crystal material, the polymer-dispersed liquid crystal material comprising, before exposure:

a polymerizable monomer;

a liquid crystal;

a cross-linking monomer;

a coinitiator; and a photoinitiator dye.

9. The apparatus of claim 1 wherein the switchable optics system further comprises:

a second group of electrically switchable holographic optical elements comprising first, second and third electrically switchable holographic optical elements coupled to the first control circuit, wherein each of the first, second and third electrically switchable holographic optical elements of the second group is electrically switchable between an active state and a deactive state, wherein each of the first, second and third electrically switchable holographic optical elements of the second group is activated or deactivated by the control circuit, wherein each of the first, second and third electrically switchable holographic optical elements of the second group is configured to diffract light incident thereon when operating in the active state, wherein each of the first, second and third electrically switchable holographic optical elements of the second group transmits light incident thereon without substantial alteration when operating in the deactive state;

wherein the display surface is configured to receive light diffracted by the first, second, and third electrically switchable holographic optical elements of the second group on the separate first, second, and third surface areas, respectively, of the display surface;

a third group of electrically switchable holographic optical elements comprising first, second and third electrically switchable holographic optical elements coupled to the first control circuit, wherein each of the first, second and third electrically switchable holographic optical elements of the third group is electrically switchable between an active state and a deactive state, wherein each of the first, second and third electrically switchable holographic optical elements of the third group is activated or deactivated by the control circuit, wherein each of the first, second, and third electrically switchable holographic optical elements of the third group is configured to diffract light incident thereon when operating in the active state, wherein each of the first, second, and third electrically switchable holographic optical elements of the third group transmits light incident thereon without substantial alteration when operating in the deactive state;

wherein the display surface is configured to receive light diffracted by the first, second, and third electrically switchable holographic optical elements of the third group on the separate first, second, and third surface areas, respectively, of the display surface.

10. The apparatus of claim 9 wherein each of the first, second and third electrically switchable holographic optical elements of the first group is configured to diffract first bandwidth light incident thereon, wherein each of the first, second and third electrically switchable holographic optical elements of the second group is configured to diffract second bandwidth light incident thereon, wherein each of the first, second, and third electrically switchable holographic optical elements of the third group is configured to diffract third bandwidth light incident thereon, wherein the first, second, and third bandwidths are distinct from each other.

11. The apparatus of claim 10 wherein each of the first electrically switchable holographic optical elements is configured to be separately activated or deactivated by the first control circuit, wherein each of the second electrically switchable holographic optical elements is configured to be separately activated or deactivated by the first control circuit, and wherein each of the third electrically switchable holographic optical elements is configured to be separately activated or deactivated by the first control circuit.

12. The apparatus of claim 11 wherein the first control circuit is configured to sequentially and cyclically activate and deactivate the first electrically switchable holographic optical elements so that only one of the first electrically switchable holographic optical elements is active at any point in time, wherein the first control circuit is configured to sequentially and cyclically activate and deactivate the second electrically switchable holographic optical elements so that only one of the second electrically switchable holographic optical elements is active at any point in time, wherein the first control circuit is configured to sequentially and cyclically activate and deactivate the third electrically switchable holographic optical elements so that only one of the third electrically switchable holographic optical elements is active at any point in time, wherein the control circuit is configured to activate only one of the electrically switchable holographic optical elements in each of the first, second, and third groups of electrically switchable holographic optical elements at any point in time.

13. The apparatus of claim 9 wherein each of the first, second, and third electrically switchable holographic optical elements is configured to diffract first, second, and third bandwidth light incident thereon, respectively, wherein the first, second, and third bandwidth lights are distinct from each other.

14. The apparatus of claim 13 wherein the first control circuit is configured to sequentially and cyclically activate and deactivate the first, second, and third electrically switchable holographic optical elements of the first, second, and third groups of electrically switchable holographic optical elements, respectively, so that only the first, second, and third groups electrically switchable holographic optical elements of only one of the first, second, and third groups of electrically switchable holographic optical elements are active at any point in time.

15. The apparatus of claim 1 further comprising:
- a light source for generating light comprising first, second and third bandwidth light;
- a collimating lens for receiving and collimating light generated by the light source;
- a filter for receiving and filtering light collimated by the collimating lens, wherein the filter filters the received collimated light into spatially separate first, second, and third bandwidth lights.

16. The apparatus of claim 15 wherein the first electrically switchable holographic optical element is configured to receive and diffract the first bandwidth light, wherein the second electrically switchable holographic optical element is configured to receive and diffract the second bandwidth light, and wherein the third electrically switchable holographic optical element is configured to receive and diffract the third bandwidth light.

17. The apparatus of claim 1 further comprising:
- a light source for generating light comprising first, second, and third bandwidth light;
- a collimating lens for receiving and collimating light generated by the light source;
- wherein each of the first, second, and third electrically switchable holographic optical elements is configured to receive the collimated light generated by the light source;
- wherein the first electrically switchable holographic optical element is configured to diffract the first bandwidth light of the collimated light received by the first electrically switchable holographic optical element when active while transmitting the second and third bandwidth light of the collimated light received by the first electrically switchable holographic optical element;
- wherein the second electrically switchable holographic optical element is configured to diffract the second bandwidth light of the collimated light received by the second electrically switchable holographic optical element when active while transmitting the first and third bandwidth light of the collimated light received by the second electrically switchable holographic optical element;
- wherein the third electrically switchable holographic optical element is configured to diffract the third bandwidth light of the collimated light received by the third electrically switchable holographic optical element when active while transmitting the second and first bandwidth light of the collimated light received by the third electrically switchable holographic optical element.

18. The apparatus of claim 1 wherein the display surface is configured to display a monochrome image.

19. The apparatus of claim 18 wherein the monochrome image comprises first, second, and third monochrome components, wherein the first monochrome image is configured to receive light diffracted by the first electrically switchable holographic optical element, wherein the second monochrome image is configured to receive the light diffracted by the second electrically switchable holographic optical, and wherein the third monochrome image is configured to receive light diffracted by the third electrically switchable holographic optical.

20. The apparatus of claim 19 wherein the display surface is configured to simultaneously display the first, second, and third monochromatic components.

21. The apparatus of claim 19 wherein the display surface is configured to sequentially display the first, second and third monochromatic components.

* * * * *